(12) United States Patent
Kitahara et al.

(10) Patent No.: US 7,576,884 B2
(45) Date of Patent: Aug. 18, 2009

(54) IMAGE OUTPUT SYSTEM, CLIENT TERMINAL DEVICE, IMAGE OUTPUT DEVICE, AND IMAGE OUTPUT METHOD USING E-MAIL TO INFORM CLIENT OF OUTPUT STATUS

(75) Inventors: Yoshinao Kitahara, Nagano (JP); Hideki Morozumi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 1082 days.

(21) Appl. No.: 10/888,505

(22) Filed: Jul. 12, 2004

(65) Prior Publication Data

US 2005/0206947 A1     Sep. 22, 2005

(30) Foreign Application Priority Data

Jul. 11, 2003  (JP)  ............................. P2003-196002
Jul. 8, 2004   (JP)  ............................. P2004-201879

(51) Int. Cl.
   *G06K 15/00*  (2006.01)
(52) U.S. Cl. ..................... 358/1.16; 368/1.15; 368/402; 709/206; 719/314; 719/315
(58) Field of Classification Search ................ 358/1.16, 358/1.15, 402; 709/206; 719/314, 315
See application file for complete search history.

(56) References Cited

U.S. PATENT DOCUMENTS

2001/0013056 A1*  8/2001  Mori et al. ................... 709/206
2002/0057449 A1*  5/2002  Chapman et al. ........... 358/1.15
2003/0095281 A1*  5/2003  Parry ........................... 358/1.15
2004/0004736 A1*  1/2004  Ogura et al. ................. 358/1.15
2004/0008373 A1*  1/2004  Yamamoto ................... 358/1.15
2004/0196492 A1*  10/2004 Johnson et al. ............. 358/1.15
2004/0246515 A1*  12/2004 Patton et al. ................ 358/1.15

FOREIGN PATENT DOCUMENTS

JP     2002-232691 A    8/2002

\* cited by examiner

*Primary Examiner*—Twyler L Haskins
*Assistant Examiner*—Jacky X Zheng
(74) *Attorney, Agent, or Firm*—Sughrue Mion, PLLC

(57) ABSTRACT

In an image output system in which a client terminal device is connected via a network to an image output device, the client terminal device contains a first transmitting/receiving unit for transmitting/receiving text data containing control information related to an image output by way of an electronic mail, whereas the image output device contains a second transmitting/receiving unit for transmitting/receiving the text data containing the control information related to the image output by way of the electronic mail between the first transmitting/receiving unit and the own second transmitting/receiving unit, and an image output unit for outputting an image based upon an image data file in accordance with the control information which is transmitted/received by the second transmitting/receiving unit.

14 Claims, 10 Drawing Sheets

IMAGE OUTPUT SYSTEM, CLIENT TERMINAL DEVICE, IMAGE OUTPUT DEVICE, AND IMAGE OUTPUT METHOD USING E-MAIL TO INFORM CLIENT OF OUTPUT STATUS

BACKGROUND OF THE INVENTION

The present invention is related to an image output system and an image output method, in which an image output process operation is carried out by an image output device in response to an image output request issued from a client terminal device, and also, related to both a client terminal device and an image output device, which are used in both the image output system and the image output method.

Recently, image output systems and services have been proposed (refer to, for instance, JP-A-2002-232691 (ABSTRACT)). In these image output systems and services, clients transmit print orders by using electronic mails, or the like, and then, when servers receive the print orders, the servers perform printing operations of images in accordance with the print orders.

However, in the above related image output system, during a communication operation before a printing operation is carried out, only order information is transmitted/received from a client to a server by way of an electronic mail along a single direction. Control information can be hardly and mutually transmitted/received between the client and the server before, during, and after an execution of an image output process operation (printing operation etc.), so that the client can hardly grasp conditions of the image output process operation.

SUMMARY OF THE INVENTION

The present invention has been made to solve the above-described problem, and therefore, has an object to provide both an image output system and an image output method, capable of grasping a condition of an image output process operation on the side of a client, and also, to provide both a client terminal device and an image output device, which are used in the above-described image output system and image output method.

To solve the above-explained problem, an image output system according to the present invention is provided with a client terminal device for transmitting an image output request and an image output device for outputting an image based upon an image data file, and is operated in accordance with the below-mentioned manner. That is, the client terminal device contains a first transmitting/receiving unit for transmitting/receiving control information as text data in a bidirectional manner by way of an electronic mail. Also, the image output device contains a second transmitting/receiving unit for transmitting/receiving the control information related to the image output as the text data in the bidirectional manner by way of the electronic mail between the first transmitting/receiving unit and the own second transmitting/receiving unit, and an image output unit for performing an image output process operation based upon the control information which is transmitted/received by the second transmitting/receiving unit.

When this image output system is used, since the control information can be transmitted from the image output device to the client terminal device by way of the electronic mail, even when the image output request is transmitted by way of the electronic mail, the condition of the image output processing operation can be grasped on the client side.

A client terminal device according to the present invention is provided with a transmitting unit for transmitting/receiving an electronic mail into which control information related to an image output has been described as text data and for transmitting the control information related to the image output by way of an electronic mail as text data to an electronic mail address of an image output device which executes an image output process operation based upon the control information, and a receiving unit for receiving the control information related to the image output from the image output device by way of the electronic mail.

When this client terminal device is used, since the electronic mail containing the control information can be received from the specific image output device to the client terminal device, even in such a case that the image output request is transmitted by way of the electronic mail, the status of the image output process operation can be grasped on the client side.

In addition, to client terminal device of the present invention, is further comprised of a storage unit for storing an image data file in addition to the above-described client terminal device. Then, the transmitting unit transmits the image data file designated by the control information received by the receiving unit to the image output device.

When this client terminal device is utilized, the image formed based upon the image data file stored in the client terminal device can be outputted by the image output device in the interactive manner.

Furthermore, in the client terminal device of the present invention, in addition to any of the above-described client terminal device, the transmitting unit transmits the text data containing the control information related to the image output as either a title portion and/or a main body portion of an electronic mail, and also, transmits an image data file as attached data of the electronic mail.

When this client terminal device is used, both the control information equal to the text data and the image data file equal to the binary data can be transferred to the image output device by employing same protocols. Accordingly, in order to transfer the image data file, a processing unit for processing another protocol need not be mounted, so that an increase of costs of an apparatus can be suppressed.

Moreover, in the client terminal device, in addition to any of the above-described client terminal device, while an image data file on a computer network is employed as an image data file of an image output subject, the transmitting unit transmits such a control information which contains storage place information indicative of a storage place of this image data file on the computer network to the image output device.

When this client apparatus is used, such an image formed based upon an image data file which has not been stored in the client terminal device can be outputted from the image output device.

Further, in addition to any of the above-described client apparatus, the client apparatus of the present invention is further comprised of a storage place specifying unit which accesses a server for storing an image data file on the computer network so as to specify a storage place of the image data file on the computer network.

When the client terminal device is used, while the storage place of the image data file on the computer network need not be entered, the image data file on the computer network can be simply outputted.

Further, in addition to any of the above-described client terminal device, the client terminal device of the present invention is further comprised of a monitoring unit for monitoring as to whether or not an electronic mail addressed to the client terminal device is received from the image output device after the control information containing the image output request has been transmitted from the transmitting unit to the image output device.

When this client terminal device is used, even in such a case that the electronic mail server is separately provided with respect to the client terminal device, the client terminal device can automatically and surely receive the electronic mail transmitted from the image output device.

Further, in addition to any of the above-described client terminal device, the client terminal device of the present invention is featured by that the transmitting unit transmits an electronic mail in accordance with SMTP and the receiving unit receives the electronic mail in accordance with either POP or IMAP.

When the client terminal device is used, the presently provided protocol can be used on TCP/IP, and an apparatus can be realized in a relatively low cost.

Further, in addition to any of the above-described client terminal device, the client terminal device of the present invention is featured by that the transmitting unit divides the image data file designated by the control information received by the receiving unit, and then, transmits the divided image data portions to the image output device as attached files of a plurality of electronic mails.

When the client apparatus is used, since the image output device can acquire the image data file in the divided image data forms, the size of the storage area for storing the image data file in the image output device can be made small.

Further, in addition to any of the above-described client terminal device, the client terminal device of the present invention is featured by that the transmitting unit divides the image data file in response to the size of the storage area for storing the image data file in the image output device, and transmits the divided image data portions to the image output device as attached files of a plurality of electronic mails.

When the client terminal device is used, the image data file can be transmitted and received as the data having the smaller size than the storage area for storing the image data file of the image output device 2, and thus, the image data file can be firmly supplied to the image output device.

Moreover, in addition to any of the above-described client terminal device, the client terminal device of the present invention is provided with: a storage unit for storing an electronic mail address of either one or a plurality of image output device; a display apparatus for displaying thereon a list of the electronic mail address of the image output device; and an input apparatus for accepting an input for designating the image output device which constitutes a transmission destination. Then the transmitting unit specifies the electronic mail address of the image output device corresponding to the designation entered to the input apparatus, and transmits the control information related to the image output to the specified image output device by way of an electronic mail.

When the client apparatus is used, the image output device which is used to output the image can be simply selected in the client terminal device.

An image output device of the present invention is featured by comprising: a receiving unit for receiving control information related to an image output as text data by way of an electronic mail; a transmitting unit for transmitting the control information related to the image output as text data by way of an electronic mail to a client terminal device which constitutes a transmission source of the electronic mail received by the receiving unit; an image data file acquiring unit for acquiring an image data file designated based upon the control information received by the receiving unit; and an image output unit for outputting an image based upon the image data file acquired by the image data file acquisition unit in accordance with the control information received by the receiving unit.

When the image output device is used, since the control information can be transmitted by way of the electronic mail to the client terminal device corresponding to the request source of the image output, the condition of the image output process operation can be grasped on the client side.

Further, in addition to the above-described image output device, the image output device of the present invention is featured by setting both the receiving unit and the image data file acquiring unit as follows: That is, the receiving unit receives the text data containing the control information related to the image output as a title portion and a main body portion of the electronic mail and receives the image data file as the attached data of the electronic mail. The image data file acquiring unit acquires the image data file from the attached data of the electronic mail received by the receiving unit.

When this image output device is used, both the control information equal to the text data and the image data file equal to the binary data can be transferred to the image output device by employing same protocols. Accordingly, in order to transfer the image data file, a processing unit for processing another protocol need not be mounted, so that an increase of costs of an apparatus can be suppressed.

Further, in addition to the above-described image output device, the image output device of the present invention is featured by setting both the receiving unit and the image data file acquiring unit as follows: That is, the receiving unit receives the control information containing storage place information indicative of a storage place of an image data file on a computer network. The image data file acquiring unit acquires the image data file from the storage place on the computer network designated based upon the storage place information, while the image data file acquiring unit controls the receiving unit so as to download this image data file.

When the image output device is used, in the client terminal device, the user need not enter the storage place of the image data file on the computer network, and the image data file on the computer network can be simply outputted.

Further, in addition to the above-described image output device, the image output device of the present invention is further comprised of a monitoring unit for monitoring as to whether or not an electronic mail addressed to the image output device is received from the image output device after the control information containing the image output request has been transmitted from the transmitting unit to the image output device.

When this image output device is used, even in such a case that the electronic mail server is separately provided with respect to the image output device, the image output device can automatically and surely receive the electronic mail transmitted from the image output device.

Further, in addition to any of the above-described image output device, the image output device of the present invention is featured by that the transmitting unit transmits an electronic mail in accordance with SMTP and the receiving unit receives the electronic mail in accordance with either POP or IMAP.

When the image output device is used, the presently provided protocol can be used on TCP/IP, and an apparatus can be realized in a relatively low cost.

Further, in addition to any of the above-described image output device, the image output device of the present invention is featured by that the image data file acquiring unit acquires a plurality of image data portions obtained by dividing the image data file as attached files of a plurality of electronic mails.

When the image output device is used, since the image data file is divided to be acquired, the size of the storage area for storing the image data file may be made small.

Further, in addition to the above-described image output device, the image output device of the present invention is featured by that the image data file acquiring unit transmits information related to either a size used to divide the image data file or a maximum value of the dividing size, and divides the image data file to transmit the divided image data portion.

When the image output device is used, the image data file can be transmitted/received as such a data having a size smaller than the size of the storage region for storing the image data file, so that the image data file can be firmly acquired.

Further, in addition to the above-described image output device, the image output device of the present invention is featured by that only in such a case that a size of the image data file is larger than a capacity of a storage area for storing the data file, the image data file acquiring unit acquires the plurality of image data portions after being divided as the attached files of the plural electronic mails.

When the image output device is used, even when the size of the image data file is larger than the size of the storage area for storing the image data file, the image data file can be transmitted/received as the image data portions having the smaller sizes than the size of the storage area for storing the image data file, so that the image data file can be firmly acquired.

Moreover, an image output method of the present invention is featured by such as image output method that an image output request is transmitted from a client terminal device to an image output device for outputting an image based upon an image data file, and then, an image output processing operation is carried out by the image output device based upon this image output request. The image output method is comprised of: a step for transmitting/receiving control information related to an image output between the client apparatus and the image output device as text data by way of an electronic mail in a bidirectional manner; and a step in which the image output processing operation is carried out by the image output device in accordance with this control information.

When this image output method is used, since the control information can be transmitted from the image output device to the client terminal device by way of the electronic mail, even when the image output request is transmitted by way of the electronic mail, the condition of the image output processing operation can be grasped on the client side.

In accordance with the present invention, even in such a case that the image output request is transmitted by way of the electronic mail, the condition of the image output processing operation can be grasped on the client side.

BRIEF DESCRIPTION OF THE DRAWINGS

The above-described object and advantages of the present invention may become apparent from explanations in a detailed description of preferred embodiments of the present invention with reference to the accompanying drawings, in which.

DETAILED DESCRIPTION OF THE PREFERRED EMBODIMENTS

Referring now to drawings, various embodiments of the present invention will be described.

First Embodiment

Figure 1:
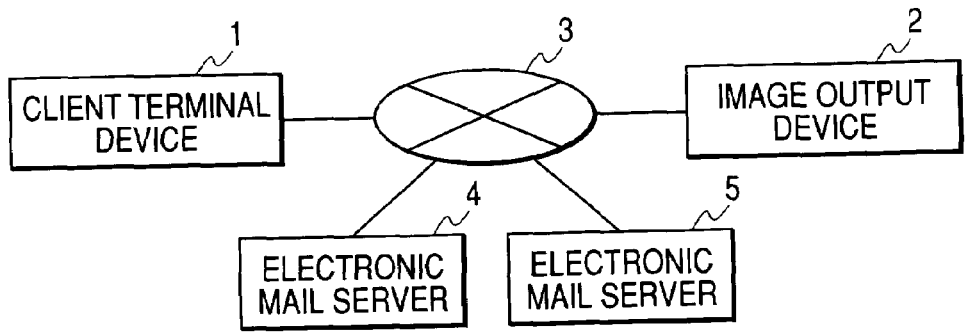
FIG. 1 is a block diagram for representing an arrangement of an image output system according to a first embodiment of the present invention.

FIG. 1 is a block diagram for indicating an arrangement of an image output system according to a first embodiment of the present invention.

In FIG. 1, a client terminal device 1 corresponds to a terminal device which may be connected to a computer network 3, and transmits/receives a text as an electronic mail. The text includes control information related to an image output such as an image output request which designates an image data file. The client terminal device 1 may be realized as the following apparatus modes, namely, a personal computer having a communication function, a mobile telephone, a PDA (Personal Digital Assistant) having a communication function, a kiosk terminal having a communication function, and the like. It should be understood that the client terminal device 1 may alternatively contain either a digital still camera or a function of this camera. In this alternative case, the client terminal device 1 may alternatively store an image data file obtained by the digital still camera, or the camera function.

It should also be noted that as such a control information, there are a control command, a response to a control command, notifications as to a status of an apparatus and a status of a job, and so on. Also, as the text, there are a control command of a text format, a response to a control command, notifications as to a status of an appliance and a status of a job, and so on. In the first embodiment, this text is described by an XML (extensible Markup Language) script. As a consequence, tags indicative of various sorts of control commands, responses of these control commands, status notifications, and the like have been previously defined. Based upon a tag, a control command, a response thereof, and a sort of a status notification are specified. Based upon a value designated by this tag, an argument of a control command, a status, an execution result of a control command, and statuses of both an appliance and a job are indicated.

Also, an image output device 2 corresponds to such an image output device which may be connected to the computer network 3, and transmits/receives a text as an electronic mail. This text contains control information related to an image output. This image output device 2 acquires an image data file designated by this control information, and outputs an image produced based upon this image data file in accordance with this control information. This image output device 2 contains an image output unit known as a printing apparatus such as a printer, a projection apparatus for projecting an image, a display apparatus for displaying thereon an image, and the like.

Also, the computer network 3 corresponds to a communication network capable of transferring an electronic mail in accordance with a protocol used to transfer an electronic mail. This computer network may be realized by the Internet, or a closed network which is not connected to the Internet. Instead of this computer network 3, a subscriber line network such as a telephone line network may be used.

In this first embodiment, the computer network 3 transfers an electronic mail in accordance with an SMTP (Simple Mail Transfer Protocol) on a TCP/IP (Transmission Control Protocol/Internet Protocol). It should also be understood that the SMTP Protocol is disclosed in, for example, RFC2821 of IETF in more detail.

Also, an electronic mail server 4 corresponds to such an electronic mail server into which an electronic mail account of the client terminal device 1 has been registered, and is a server apparatus which is connected to the computer network 3, and owns a function of an SMTP server and POP3 server.

Also, an electronic mail server 5 corresponds to such an electronic mail server into which an electronic mail account of the image output device 2 has been registered, and is a server apparatus which is connected to the computer network 3, and owns a function of an SMTP server and POP3 server.

Figure 2:
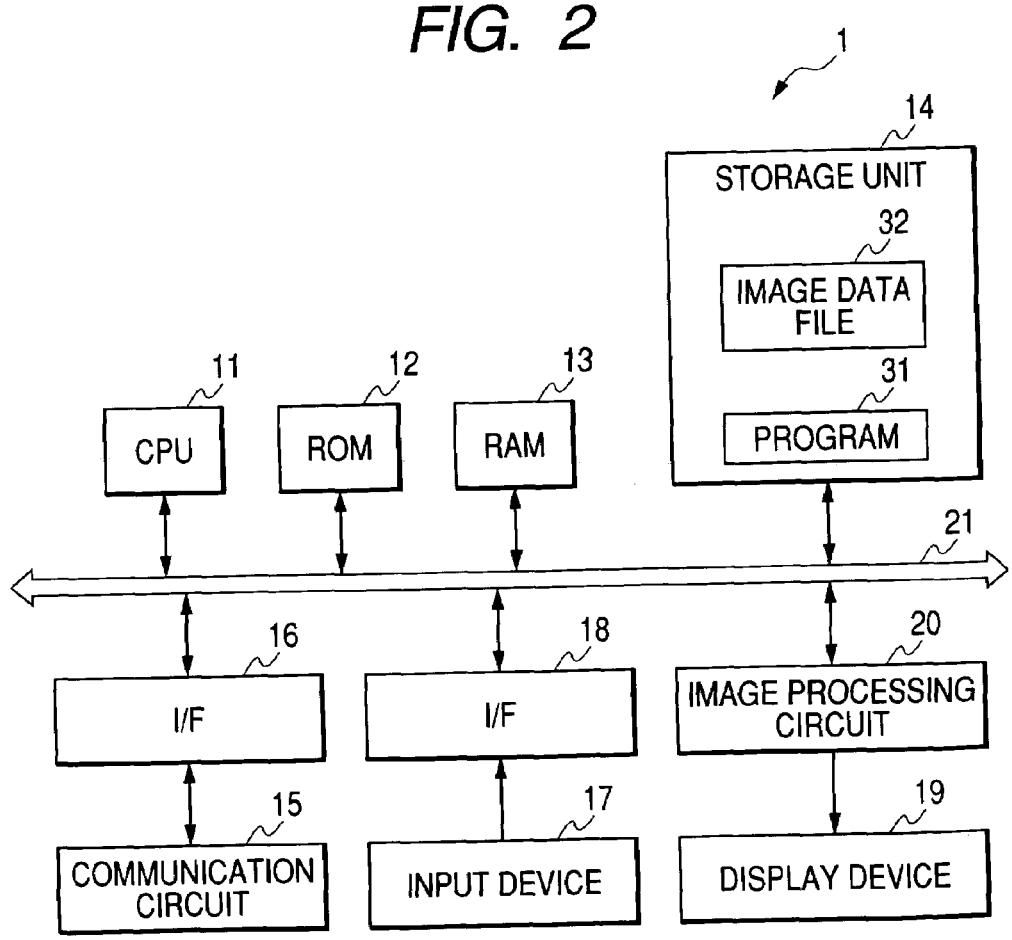
FIG. 2 is a block diagram for showing an arrangement of a client terminal device employed in the image output system according to the first embodiment of the present invention.

FIG. 2 is a block diagram for indicating an arrangement of a client terminal device 1 employed in the image output system according to the first embodiment of the present invention. In FIG. 2, a CPU 11 corresponds to a calculation processing apparatus which executes a program so as to perform process operations described in this program. Also, a ROM 12 is a non-volatile memory which has previously stored thereinto programs and data. Also, a RAM 13 is a memory in which when a program is executed, this program and data are temporarily stored.

Also, a storage unit 14 corresponds to an apparatus which stores thereinto a program 31, and an image data file 32 if necessary, while the program 31 is used in order that since a communication circuit 15 is controlled, an electronic mail is transmitted/received, control information is transmitted/received by the electronic mail, and thus, an image output processing operation is carried out.

As this storage unit 14, a recording medium having a portability such as a non-volatile memory, a memory card, a hard disk drive apparatus, and a compact disk is used. The storage unit 14 may be alternatively built in the client terminal device 1, or may be alternatively connected to the client terminal device 1 as an external apparatus. Also, an image data file 32 corresponds to a data file having image data in a predetermined file format such as JPEG (Joint Photographic Experts Group), and EXIF (EXchangeable Image File format).

It should be understood that an operating system (OS: not shown), device drivers used to drive interfaces 16, 18, and an image processing circuit 20, and the like are stored in the storage unit 14, if necessary. Further, electronic mail setting information is stored in the storage unit 14, while the electronic mail setting information corresponds to an electronic mail address allocated to the client terminal device 1, either an IP address or a name (namely, machine name and domain name) of the electronic mail server 4 into which an electronic mail account of this electronic mail address, electronic mail account information (namely, logon IDs and passwords with respect to SMTP server and POP3 server), and the like. Also, an electronic mail address of the image output device 2 is previously stored in this storage unit 14.

A communication circuit 15 is such a communication circuit which is connectable to the computer network 3 by way of either a wireless manner or a wired manner. For instance, the communication circuit 15 accesses an access point which is connected to the computer network 3 so as to be connected to the computer network 3. As this communication circuit 15, a network interface card and a modem are used which are built in, or connected to a personal computer; a wireless LAN card and a wireless data communication card are used which may be mounted on a PDA and a portable type personal computer; and also, a baseband processing unit of a mobile telephone is used. The interface 16 corresponds to an interface circuit which is connected to a bus 21, and which can connect the communication circuit 15. It should also be understood that in such a case that a communication card such as a network interface card which may be built in a computer is employed as the communication circuit 15, the communication circuit 15 may be directly connected to the bus 21. In the case that the communication circuit 15 corresponds to an external apparatus as the interface 16, such an interface as USB and RS-232C for connecting external apparatus may be utilized.

Also, the input apparatus 17 corresponds to an apparatus which accepts an operation of a user and electrically outputs information of this operation. As this input apparatus 17, an operation button and an operation dial provided on a housing surface of the client terminal device 1 are used, and also, a keyboard and a mouse are used. Also, the input apparatus 17 may be alternatively realized by a speech recognition system containing a touch tablet and a microphone. An interface 18 corresponds to an interface circuit which is connected to the bus 21, and to which the input apparatus 17 may be connected. It should be noted that as the interface 18, an interface such as a PS/2 interface and USB (Universal Serial Bus) is used in the case that the input apparatus 17 is a keyboard, or a mouse.

The image processing circuit 20 corresponds to such a circuit that when image data is written into this circuit, an image signal corresponding to the written image data is outputted. A display apparatus 19 for displaying thereon an image based upon this image signal is connectable to the image processing circuit 20, or is provided on a housing of the client terminal device 1. The display apparatus 19 is such a display apparatus which displays thereon various sorts of information. As this display apparatus 19, a liquid crystal display, and the like are used.

The bus 21 corresponds to a signal path which is used to mutually connect the CPU 11, the ROM 12, the RAM 13, the storage unit 14, the interfaces 15 and 18, and also, the image processing circuit 20. In the case that this client terminal device 1 is a personal computer, a bus having a specification of PCI (Peripheral Component Interconnect), or the like is utilized as the bus 21. It should also be understood that a total path number of the bus 21, and connection modes of the CPU 11 etc. to the bus 21 are not limited only to those indicated in FIG. 2.

Figure 3:
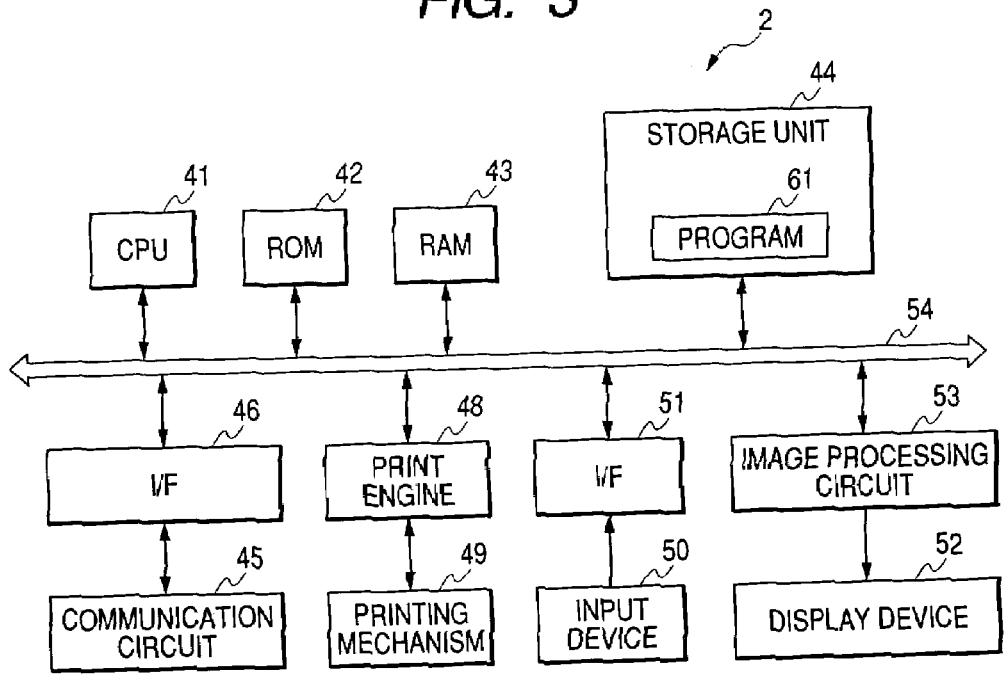
FIG. 3 is a block diagram for representing an arrangement of an image output device employed in the image output system according to the first embodiment of the present invention.

FIG. 3 is a block diagram for indicating an arrangement of an image output device 2 employed in the image output system according to the first embodiment of the present invention. The image output device 2 shown in FIG. 3 owns a mode of a printing apparatus. In FIG. 3, a CPU 41 corresponds to a calculation processing apparatus which executes a program so as to perform process operations described in this program. Also, a ROM 42 is a non-volatile memory which has previously stored thereinto programs and data. Also, a RAM 43 is a memory in which when a program is executed, this program and data are temporarily stored.

Also, a storage unit 44 corresponds to an apparatus which stores thereinto a program 61, while the program 61 is used in order that since a communication circuit 45 is controlled, an electronic mail is transmitted/received, control information is transmitted/received by the electronic mail so as to carry out an image output processing operation, and also a printing process operation based upon an image data file.

As this storage unit 44, a recording medium having a portability such as a non-volatile memory, a memory card, a hard disk drive apparatus, and a compact disk is used.

It should also be noted that electronic mail setting information is stored in the storage unit 44, while the electronic mail setting information corresponds to an electronic mail address allocated to the image output device 2, either an IP address or a name (namely, machine name and domain name) of the electronic mail server 5 into which an electronic mail account of this electronic mail address has been registered, electronic mail account information (namely, IDs, passwords, and the like), and the like.

Also, an acquired image data file is stored in this storage unit 14, if required.

A communication circuit 45 is such a communication circuit which is connectable to the computer network 3 by way of either a wireless manner or a wired manner. For instance, the communication circuit 45 accesses an access point which is connected to the computer network 3 so as to be connected to the computer network 3. As this communication circuit 45, a network interface card, a modem, a wireless LAN card, a wireless data communication card, and the like are used which are built in, or connected to an apparatus. The interface 46 corresponds to an interface circuit which is connected to a bus 54, and which can connect the communication circuit 45. It should also be noted that in such a case that the communication circuit 45 is built in the apparatus, the communication circuit 45 may be directly connected to the bus 54. In the case that the communication circuit 45 corresponds to an external apparatus as the interface 46, such an interface as USB and RS-232C for connecting external apparatus may be utilized.

A print engine 48 corresponds to a control circuit operated in such a manner that when a print control command such as an ESC/P (Epson Standard Code for Printer) is supplied to this control circuit, the control circuit controls a printing mechanism 49 in response to this print control command so as to execute a printing process operation as an image output processing operation. Also, the printing mechanism 49 corresponds to a mechanism having a recording mechanism for recording an image on a medium such as paper; a feeding mechanism for supplying, ejecting, and feeding this medium; and a driving unit such as a motor which drives these recording mechanism and feeding mechanism.

Also, the input apparatus 50 corresponds to an apparatus which accepts an operation by a user and electrically outputs information of this operation. As this input apparatus 50, an operation button and an operation dial provided on a housing surface of the image output device 2 are used. The interface 51 corresponds to an interface circuit which is connected to the bus 54, and to which the input apparatus 50 may be connected.

The image processing circuit 53 corresponds to such a circuit that when image data is written into this circuit an image signal corresponding to the written image data is outputted. A display apparatus 52 for displaying thereon an image based upon this image signal is connectable to the image processing circuit 53. The display apparatus 52 is such a display apparatus which is provided on the housing of the image output device 2, or is connected to the image output device 2 so as to display thereon various sorts of information. As this display apparatus 52, a liquid crystal display, and the like are used.

The bus 54 corresponds to a signal path which is used to mutually connect the CPU 41, the ROM 42, the RAM 43, the storage unit 44, the interfaces 45 and 51, the print engine 48, and also, the image processing circuit 53. It should also be understood that a total path number of the bus 54, and connection modes of the CPU 41 etc. to the bus 54 are not limited only to those indicated in FIG. 3.

Figure 4:
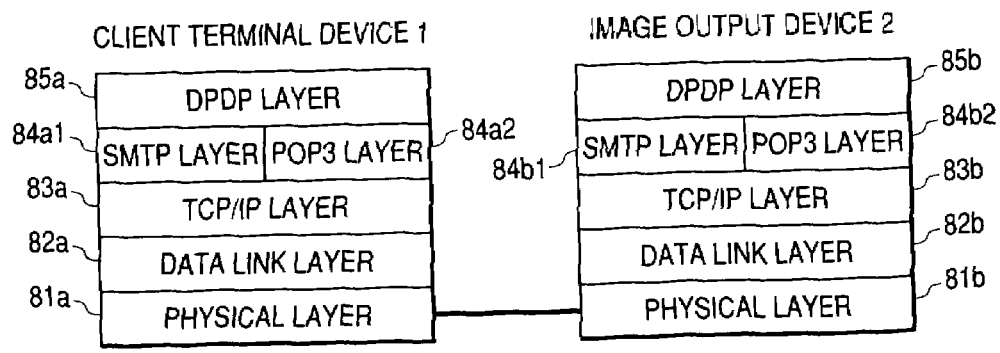
FIG. 4 is a diagram for representing protocol processing layers in a hierarchical manner, which are realized in both the client terminal device and the image output device of the image output system according to the first embodiment of the present invention.

FIG. 4 is a diagram for representing protocol processing layers in a hierarchical manner, which is realized in both the client terminal device 1 and the image output device 2 of the image output system according to the first embodiment of the present invention. As shown in FIG. 4, in the client terminal device 1, both a physical layer 81a and a data link layer 82a correspond to a processing unit which transmits and receives an IP packet, and is realized by the communication circuit 15. Also, a TCP/IP layer 83a corresponds to a processing unit which transmits and receives data by an IP packet in an upper grade of the data link layer 82a, and manages sessions with respect to a connection counter party in accordance with TCP. This TCP/IP layer 83a may be realized by executing, for example, a library which is prepared as a portion of the program 31.

Also, an SMTP layer 84a1 corresponds to a processing unit which executes a transmitting process operation which transmits an electronic mail to an electronic mail server as an SMTP client in the upper grade of TCP/IP.

A POP3 layer 84a2 corresponds to a processing unit which performs a reception process operation for receiving an electronic mail from an electronic mail server in accordance with POP3 as a POP3 (Post Office Protocol version 3) client in an upper grade of TCP/IP. It should also be noted that POP3 is disclosed in detail in, for example, RFC1939 of IETF.

Also, a DPDP layer 85a corresponds to a processing unit for executing an image output processing operation in accordance with a predetermined image output control-purpose protocol (will be referred to as "DPDP" hereinafter) in an upper grade of both the SMTP layer 84*a*1 and the POP3 layer 84*a*2. In other words, the DPDP layer 85*a* transmits an electronic mail containing image output control information described by a text by using the SMTP protocol, and receives an electronic mail containing image output control information described by a text by using the POP3 protocol.

These SMTP layer 84*a*1, POP3 layer 84*a*2, and DPDP layer 85*a* are realized as an application program which is prepared as a portion of the program 31.

Also, as indicated in FIG. 4, similar to the client terminal device 1, in the image output device 2, processing units are sequentially provided from a lower grade to an upper grade in this order from a physical layer 81*b*, a data link layer 82*b*, a TCP/IP layer 83*b*, an SMTP layer 84*b*1, a POP3 layer 84*b*2, and a DPDP layer 85*b*. The physical layer 81*b*, the data link layer 82*b*, the TCP/IP layer 83*b*, the SMTP layer 84*b*1, and the POP3 layer 84*b*2 may alternatively own similar functions to those of the physical layer 81*a*, the data link layer 82*a*, the TCP/IP layer 83*a*, the SMTP layer 84*a*1, and the POP3 layer 84*a*2.

A DPDP layer 85*b* corresponds to a processing unit for executing an image output processing operation in accordance with a predetermined DPDP in an upper grade of both the SMTP layer 84*b*1 and the POP layer 84*b*2. It should be noted that since the DPDP layer 85*a* of the client terminal device 1 executes a process operation on the side of the client and the DPDP layer 85*b* of the image output device 2 executes a process operation on the side of the server, both the DPDP layer 85*a* and the DPDP layer 85*b* become asymmetrical with each other.

Figure 5:
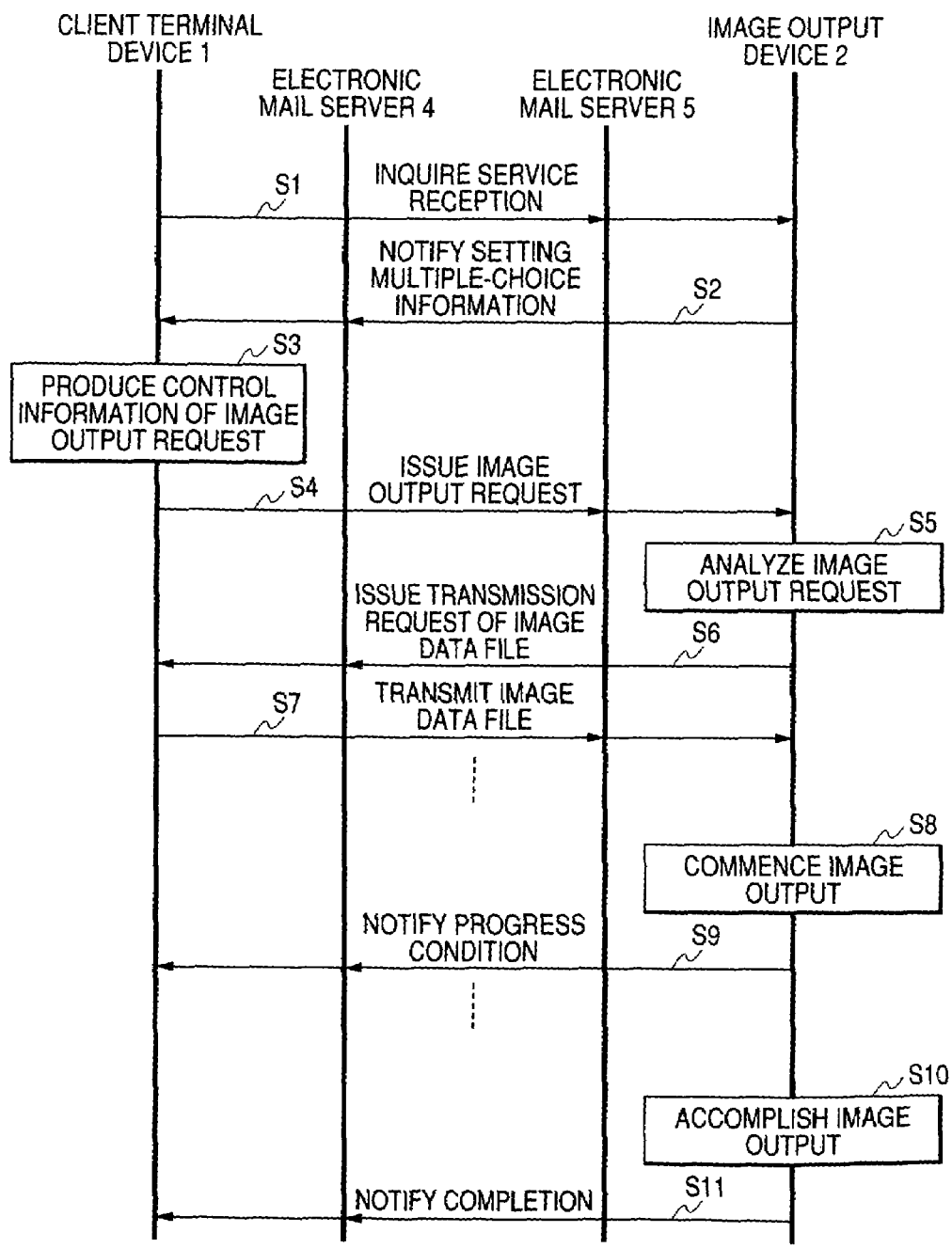
FIG. 5 is a diagram for explaining an image output processing operation executed in the image output system according to the first embodiment of the present invention.

Next, a description is made of operations of the respective apparatus employed in the above-described image output system. FIG. 5 is a diagram for explaining image output processing operations in the image output system according to the first embodiment of the present invention.

First, in the client terminal device 1, when the image output system is initiated, or when a predetermined operation is entered to the input apparatus 17 by the user, the CPU 11 loads either a portion or an entire portion of the program 31 on the RAM 13 so as to commence this program 31. As a result, the respective processing units located lower than, or equal to the DPDP layer 85*a* shown in FIG. 4 are realized. It should be noted that in such a case that operating system has been installed in the client terminal device 1, when the image output system is initiated, the CPU 11 initiates this installed operating system, and immediately after the system initiation, the CPU 11 commences to execute the program 31. Otherwise, when a predetermined operation is performed by the user based upon a user interface by the operating system, the CPU 11 starts to execute the program 31.

Also, in the image output device 21, when the image output system is initiated, or when a predetermined operation is entered to the input apparatus 50 by the user, the CPU 41 loads either a portion or an entire portion of the program 61 on the RAM 43 so as to commence this program 41. As a result, the respective processing units located lower than, or equal to the DPDP layer 85*b* shown in FIG. 4 are realized.

After the program 61 has been initiated, the image output device 2 is once brought into a waiting condition for an image output service, and accesses the electronic mail server 5 by the POP3 layer 84*b*2 in a periodic manner so as to acquire an electronic mail directed to the own electronic mail address.

Then, in the client terminal device 1, the CPU 11 automatically inquires the image output device 2 as to whether or not an image output service is being accepted when the program 31 is initiated in accordance with the program 31, or in response to the operation entered to the input apparatus 17 by the user (step S1). At this time, the CPU 11 functioning as the DPDP layer 85*a* produces a control command by an XML script, and this control command corresponds to a response request as to whether or not the image output server is being accepted. While the electronic mail address of the image output device 2 is used as a destination, the own electronic mail address is employed as a transmission source, and the XML script thereof is used as a main body of an electronic mail, the CPU 11 transmits the XML script of the SMTP layer 84*a*1. At this time, in order to indicate that this electronic mail is related to the image output service made by the image output device 2, a predetermined character string may be alternatively defined as a title (value of "Subject:" field) of the electronic mail.

Thereafter, the client terminal device 1 is brought into such a condition for waiting for a response from the image output device 2, and accesses the electronic mail server 4 by the POP3 layer 84*a*2 in a periodic manner so as to acquire an electronic mail directed to the own electronic mail address.

The CPU 11 functioning as the SMTP layer 84*a*1 of the client terminal device 1 produces a content of an electronic mail, while an electronic mail address of the image output device 2 corresponding to a destination, the own electronic mail address corresponding to a transmission source, and the like are employed as a header, and an XML script thereof is used as a main body of the electronic mail. The CPU 11 transmits this produced content to the electronic mail server 4 by using an SMTP command. The electronic mail server 4 functioning as the SMTP server specifies a host machine of a domain, namely the electronic mail server 5, from the domain of the electronic mail address of the image output device 2 corresponding to the destination of this electronic mail by using the domain name system (DNS), and then transfers this electronic mail to the electronic mail server 5. The electronic mail server 5 receives this electronic mail in accordance with the SMTP protocol, and then, stores the data (content) of this electronic mail in a folder (otherwise, directory) which is related to an electronic mail account having the mail address of the destination.

Then, if the image output device 2 has commenced the image output service, then the DPDP layer 85*b* of the image output device 2 accesses the electronic mail address 5 in the periodic manner by the POP3 layer 84*b*2, and acquires the electronic mail addressed to the own electronic mail address, so that the electronic mail addressed to the image output device 2 which has been stored in the electronic mail server 5 is received by the image output device 2.

The electronic mail containing the text data indicative of the control information is transferred from the client terminal device 1 to the image output device 2 in accordance with the above-described manner.

When the CPU 41 functioning as the DPDP layer 85*b* of the image output device 2 receives a response request as to whether or not the above-explained image output service is being accepted, the CPU 41 firstly specifies a transmission source from a value of a "From:" field of this electronic mail, and produces an XML script as a response for informing that the image output service is being accepted, while a list of selectable values (will be referred to as "multiple-choice information" hereinafter) as to respective setting items of the image output processing operation by the image output device 2 is employed as the control information.

For instance, in the case that the image output device 2 corresponds to a printing apparatus, as the setting items, the following sorts are provided, namely, a sort of printing quality (draft printing, precise printing etc.); a sort of printing paper (normal paper, photo-paper etc.); a sort of paper size (A4- size, B5-size etc.); a sort of file format (JPEG, GIF, EXIF etc.) as to an image data file from which an image can be outputted; a sort of date printing (date printing ON, date printing OFF, etc.); a sort of file name printing (file name printing ON, file name printing OFF, etc.); a sort of image optimizing process (APF: Auto Print Fine, PIM: Print Image Matching); and a sort of printing layout (1-up, 2-up, 4-up, printing without frame etc.), and so on.

Then, the CPU 41 functioning as the DPDP layer 85*b* transmits the XML script containing this control command, while the electronic mail address of the client terminal device 1 of the specified transmission source is employed as a destination and the own electronic mail address is employed as a transmission source, and also, transmits the XML script of the SMTP layer 84*b*1 while this XML script is employed as the main body of the electronic mail (step S2).

The CPU 41 functioning as the SMTP layer 84*b*1 of the image output device 2 produces a content of an electronic mail, while an electronic mail address of the client terminal device 1 corresponding to a destination, the own electronic mail address corresponding to a transmission source, and the like are employed as a header, and an XML script thereof is used as a main body of the electronic mail. The CPU 41 transmits this produced content to the electronic mail server 5 by using an SMTP command. The electronic mail server 5 functioning as the SMTP server specifies a host machine of a domain, namely the electronic mail server 4, from the domain of the electronic mail address of the client terminal device 1 corresponding to the destination of this electronic mail by using the domain name system (DNS), and then transfers this electronic mail to the electronic mail server 4. The electronic mail server 4 receives this electronic mail in accordance with the SMTP protocol, and then, stores the data (content) of this electronic mail in a folder (otherwise, directory) which is related to an electronic mail account having the mail address of the destination.

Then, the client terminal device 1 accesses the electronic mail server 4 in the periodic manner and acquires the electronic mail addressed to the own electronic mail address, so that the electronic mail addressed to the client terminal device 1 which has been stored in the electronic mail server 4 is received by the client terminal device 1.

The electronic mail containing the text data indicative of the control information is transferred from the image output device 2 to the client terminal device 1 in this manner.

Next, in the client terminal device 1, the CPU 11 functioning as the DPDP layer 85*a* selects values of respective setting items within a range of setting values which are designated based upon the received multiple-choice information in accordance with the operation of the user with respect to the input apparatus 17, and furthermore, determines a condition of other image output process operations. For instance, in such a case that the image output device 2 corresponds to a printing apparatus, the CPU 11 determines a total printing number and the like in combination with the above-described conditions. Also, the CPU 11 functioning as the DPDP layer 85*a* causes the image processing circuit 20 to display a menu on the display apparatus 19. The menu uses, for example, a file name, an image, a thumbnail image, and the like of an image data file 32. Thereafter, the CPU 11 functioning as the DPDP layer 85*a* selects any one of the image data files 32 as an image output subject.

Then, the CPU 11 functioning as the DPDP layer 85*a* produces a control command for requesting an image output request as an XML script based upon the image data file 32 corresponding to the determined image output condition and the selected image output subject (step S3). It should also be noted that in the image output request, the image data file 32 is designated by a file path, a file ID, and the like in the storage unit 14.

Then, the DPDP layer 85*a* of the client terminal device 1 transmits the XML script in which the control command of this image output request has been described as an electronic mail to the image output device 2 by the SMTP layer 84*a*1 (step S4).

It should also be understood that since a transfer operation of the electronic mail from the client terminal device 1 to the image output device 2 is carried out in a similar manner to that of the above-explained case, a detailed description thereof is omitted (this may be similarly applied to below-mentioned description).

In the image output device 2, when the CPU 41 functioning as the DPDP layer 85*b* receives this electronic mail, the CPU 41 extracts the image output request from the received electronic mail, and analyzes a content of the extracted image output request (step S5). In other words, the CPU 41 functioning as the DPDP layer 85*b* specifies an image data file as to both the image output condition and the image output subject.

Then, the CPU 41 of the image output device 2 produces a control command as an XML script as the DPDP layer 85*b*, and transmits the produced XML script as an electronic mail as the SMTP layer 84*b*1, while this control command corresponds to the transmission request for the image data file of this image output subject (step S6). It should also be understood that since a transfer operation of the electronic mail from the image output device 2 to the client terminal device 1 is carried out in a similar manner to that of the above-explained case, a detailed description thereof is omitted (this may be similarly applied to below-mentioned description).

In the client terminal device 1, when this electronic mail is received, the CPU 11 functioning as the DPDP layer 85*a* produces an XML script as to a response to this image data file transmission request, and reads out the image data file 32 from the storage unit 14, which is designated by the image data file transmission request contained in this received electronic mail. Then, the CPU 11 functioning as the DPDP layer 85*a* transmits an electronic mail by the SMTP layer 84*a*1, while the XML script of this response is used as a main body of this electronic mail and the read image data file 32 is employed as attached data (step S7).

Thereafter, as explained above, the CPU 11 functioning as the SMTP layer 84*a*1 produces a content of an electronic mail having a body of multiple parts, and then, transmits this electronic mail by way of the SMTP command. The body is made of an MIME (Multipurpose Internet Mail Extensions)—purpose header into which the destination and the transmission source have been set, and the XML script of this response produced based upon MIME, and further, the attached data of the image data file 32. Since a transfer operation subsequent to the above-descried operation of this electronic mail is carried out in a similar manner to that of the above-described case, a detailed explanation thereof is omitted. In the image output device 2, when this electronic mail is acquired from the electronic mail server 5, the CPU 41 functioning as the DPDP layer 85*b* stores the received image data file into either the RAM 43 or the storage unit 44 in combination with the XML script of the response.

As previously explained, either one or a plurality of image data files which are designated by the image output request are transferred from the client terminal device 1 to the image output device 2. It should also be noted that when a plurality of image data files are transferred, the process operations defined in the above-described step S6 and step S7 are carried out plural times by the client terminal device 1 and the image output device 2.

Figure 6:
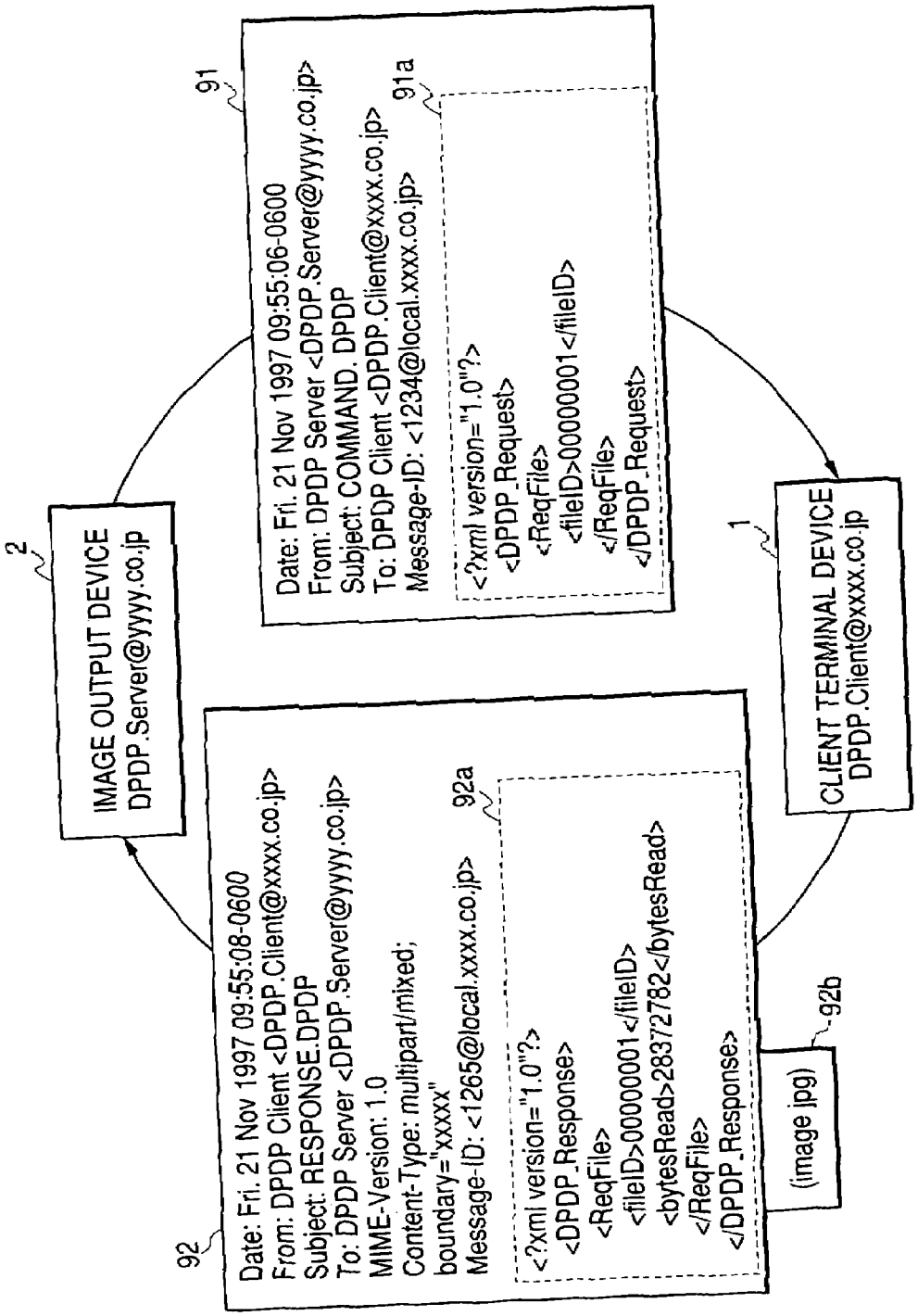
FIG. 6 is a diagram for explaining a bidirectional transfer operation of control information executed in the image output system according to the first embodiment of the present invention.

FIG. 6 is a diagram for explaining a bidirectional transfer operation of control information in the image output system according to the first embodiment of the present invention. It should be understood that an address of an electronic mail and a content of the electronic mail are merely one example, and therefore, the present invention is not limited thereto.

As indicated in FIG. 6, in the process operations defined in both the step S6 and the step S7, an electronic mail 91 which contains a control command of an image data file transmission request is transmitted from the image output device 2 having such an electronic mail address as "DPDP.Server@yyyy.co.jp" to an electronic mail address "DPDP.Client@xxxx.co.jp" of the client terminal device 1. Then, another electronic mail 92 containing this control command is transmitted from the client terminal device 1 thereof to the electronic mail address "DPDP.Server@yyyy.co.jp" of the image output device 2.

In the electronic mail 91 represented in FIG. 6, a value of a "From:" field indicative of a transmission source is assumed as "DPDP Server <DPDP.Server@yyyy.co.jp>", whereas a value of a "TO:" field indicative of a destination is assumed as "DPDP Client <DPDP.Client@xxxx.co.jp>". Also, in the electronic mail 91, a value of a "Subject:" field indicative of a title is assumed as a specific character string "COMMAND-.DPDP" representative of the control command in this image output service. Then, a main body of the electronic mail 91 is assumed as an XML script 91a which corresponds to a control command equal to a transmission request of an image data file in which a file ID is "00000001". It is so assumed that this file ID "00000001" is equal to a value which is designated in the image output request by the client terminal device 1.

Also, an electronic mail 92 shown in FIG. 6 corresponds to an MIME electronic mail which contains an XML script 92a and an image data file 92b. In the electronic mail 92, a value of a "From:" field indicative of a transmission source is assumed as "DPDP Client <DPDP.Client@xxxx.co.jp>", whereas a value of a "TO:" field indicative of a destination is assumed as "DPDP Server <DPDP.Server@yyyy.co.jp>". Also, in the electronic mail 92, a value of a "Subject:" field indicative of a title is assumed as a specific character string "RESPONSE.DPDP" representative of the control command in this image output service.

Further, both a character string "MIME—Version: 1.0" for indicating that the electronic mail 92 is an MIME electronic mail and another character string "Content—Type: multipart/mixed;" for indicating that the sort of content is a multipart, are inserted in a header of the electronic mail 92.

Then, a body of the electronic mail 92 is assumed as the XML script 91a corresponding to a response of the control command which is equal to the transmission request of the image data file whose file ID is "00000001", and also, the image data file 92 which has been coded by a predetermined coding system such as "base 64".

Thereafter, the image output device 2 commences an image output processing operation based upon the image output condition and the image data file, which are designated by the image output request (step S8).

In such a case that the image output device 2 corresponds to a printing apparatus, the CPU 41 performs a color converting process operation, a half tone processing operation, and the like with respect to image data within the image data file based on the program 61. The CPU 41 produces a print control command for recording the image on the medium based upon both the processed image data and the above-explained image output condition, and then, supplies this produced print control command to the print engine 48. Then, the print engine 48 controls the printing mechanism 49 in accordance with this print control command so as to record the image on the medium.

Then, while the image output processing operation is advanced, the image output device 2 produces a status notification of an image output job as an XML script every time, for example, the image output process operation is completed with respect to the respective image data files of a plurality of image data files designated by the image output request, if necessary. The image output device 2 transmits this produced XML script by way of an electronic mail to the client terminal device 1 corresponding to the request source of this image output job (step S9). When the client terminal device 1 receives the status notification, the client terminal device 1 displays the information of this status notification on the display apparatus 19 in the form of a character and a figure.

Alternatively, the client terminal device 1 may transmit an interrupt request of an image output job in the form of an electronic mail to the image output device 2 in response to a predetermined operation made by the user. In this alternative case, when the image output device 2 receives the interrupt request, the image output device 2 interrupts the image output job which is requested by the relevant client terminal device 1.

Then, when the image output device 2 accomplishes the image output job requested from the client terminal device 1 (step S10), the image output device 2 transmits a status notification as an XML script by way of an electronic mail, while the status notification notifies that the image output job is completed (step S11). When the client terminal device 1 receives the transmitted status notification, the information as to this received status notification is displayed as a character and a figure on the display apparatus 19.

As previously described, in accordance with the above-explained first embodiment, the SMTP layer 84a1 of the client terminal device 1 functioning as the transmitting unit transmits the control information related to the image output as the text data to the electronic mail address of the image output device 2 by way of the electronic mail, and then, the POP3 layer 84a2 functioning as the receiving unit receives the control information related to the image output from the image output device 2 as the text data by way of the electronic mail. Also, the POP3 layer 84b2 of the image output device 2, functioning as the receiving unit, receives the control information related to the image output as the text data by way of the electronic mail. The SMTP layer 84b1 functioning as the transmitting unit transmits the control information related to the image output as the text data to the client terminal device 1 of the transmission source as to the electronic mail received by the POP3 layer 84b2 by way of the electronic mail. Then, the DPDP layer 85b acquires the image data file from the electronic mail received by the POP3 layer 84b2 as the image data file acquiring unit. Furthermore, both the print engine 48 and the printing mechanism 49 output such an image formed based upon the image data file acquired by the DPDP layer 85b.

As a result, since the electronic mail containing the control information can be transferred from the specific image output device 2 to the client terminal device 1, even in such a case that the client terminal device 1 transmits the image output request to the specific image output device 2 by way of the electronic mail, the status of the image output process operation can be grasped on the client side.

In addition, in accordance with the above-explained first embodiment, the client terminal device 1 is equipped with the storage unit 14 which functions as the storage unit and stores thereinto the image data file 32. Then, the SMTP layer 84a1 transmits to the image output device 2, the image data file 32 designated by the control information of the image data file transmission request which is received by the POP3 layer 84a2.

As a consequence, the image formed based upon the image data file 32 stored in the client terminal device 1 can be outputted by the image output device 2 in the interactive manner.

Furthermore, in accordance with the above-explained first embodiment, the SMTP layer 84a1 of the client terminal device 1 transmits the text data containing the control information related to the image output as the main body portion, and also, transmits the image data file 32 as the attached data of the electronic mail. Then, the POP3 layer 84b2 of the image output device 2 receives the text data containing the control information related to the image output as the main body portion of the electronic mail, and also, receives the image data file 32 as the attached data of the electronic mail. The DPDP layer 85b acquires the image data file 32 from the attached data of the electronic mail received by the POP3 layer 84b2.

As a result, both the control information equal to the text data and the image data file 32 equal to the binary data can be transferred to the image output device 2 by employing a series of same protocols such as the SMTP protocol and the POP3 protocol. Accordingly, in order to transfer the image data file 32, a processing unit for processing another protocol need not be mounted, so that an increase of costs of an apparatus can be suppressed.

Moreover, in accordance with the above-described first embodiment, the DPDP layer 85a of the client terminal device 1 functioning as the monitoring unit monitors the following condition. That is, after the control information containing the image output request has been transmitted to the image output device 2 by the SMTP layer 84a1, the POP3 layer 84a2 monitors as to whether or not the electronic mail addressed to this client terminal device 1 from the above-explained image output device 3.

As a consequence, even in such a case that the electronic mail server 4 is separately provided with respect to the client terminal device 1, the client terminal device 1 can automatically and surely receive the electronic mail transmitted from the image output device 2.

Further, in accordance with the above-described first embodiment, the SMTP layer 84a1 of the client terminal device 1 transmits the electronic mail in accordance with the SMTP protocol, and the POP3 layer 84a2 receives the electronic mail in accordance with the POP3 protocol. Also, the SMTP layer 84b1 of the image output device 2 transmits the electronic mail in accordance with the SMTP protocol, and the POP3 layer 84b2 receives the electronic mail in accordance with the POP3 protocol.

As a consequence, the presently-provided protocol can be used on TCP/IP, and an apparatus can be realized in a relatively low cost.

Moreover, in accordance with the above-described first embodiment, the DPDP layer 85b of the image output device 2 functioning as the monitoring unit monitors the following condition. That is, after the control information has been transmitted to the client terminal device 1 by the SMTP layer 84b1, the POP3 layer 84b2 monitors as to whether or not the electronic mail addressed to this image output device 2 from the above-explained client terminal device 1.

As a consequence, even in such a case that the electronic mail server 5 is separately provided with respect to the image output device 2, the image output device 2 can automatically and surely receive the electronic mail transmitted from the client terminal device 1.

Second Embodiment

Figure 7:
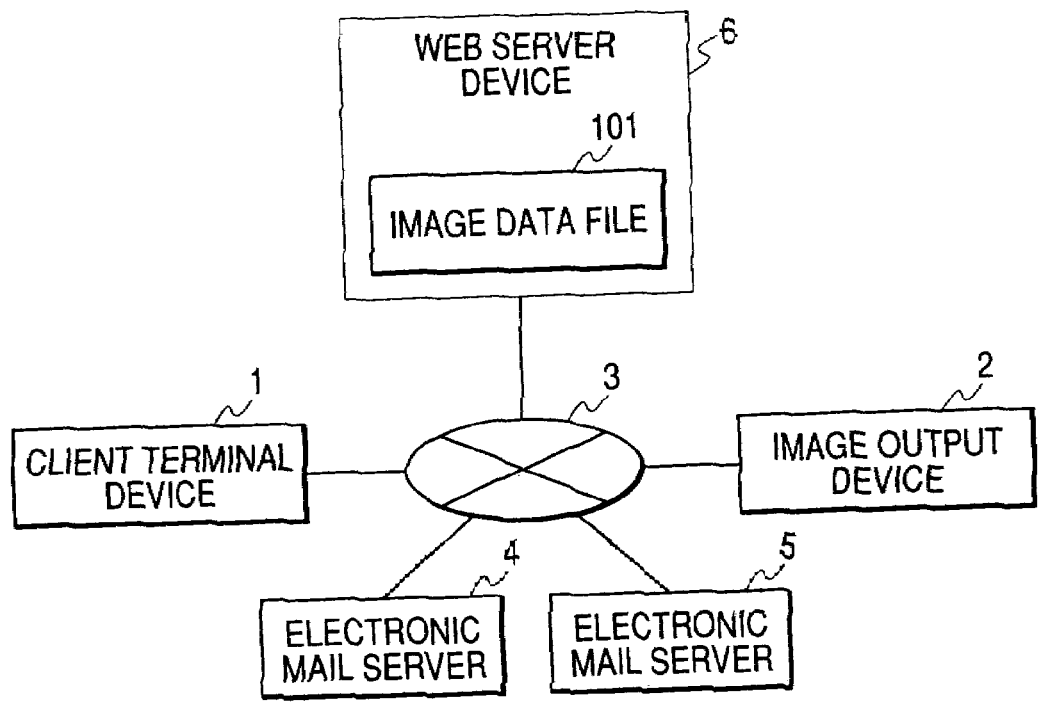
FIG. 7 is a block diagram for representing an arrangement of an image output system according to a second embodiment of the present invention.

FIG. 7 is a block diagram for indicating an arrangement of an image output system according to a second embodiment of the present invention. In FIG. 7, a Web server apparatus 6 corresponds to a server apparatus which is connected to a computer network 3, and owns an HTTP (HyperText Transfer Protocol) server function. In this Web server apparatus 6, an image data file 101 having a predetermined URL (Uniform Resource Locator) is stored in a storage unit (not shown).

It should be noted that since other structural elements in the image output system of FIG. 7 are similar to those of the above-described first embodiment, explanations thereof are omitted. However, a client terminal device 1 employed in the image output system according to the second embodiment need not store an image data file 32. Also, both the client terminal device 1 and the image output device 2 employed in the image output system according to the second embodiment own HTTP client functions.

Figure 8:
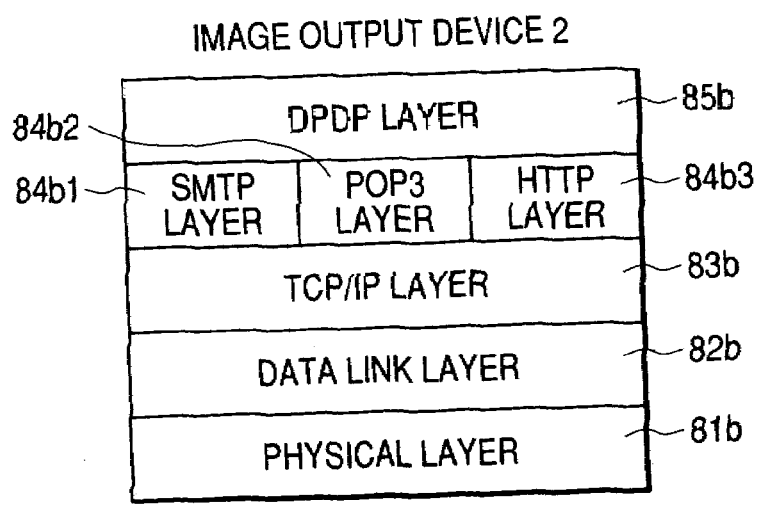
FIG. 8 is a diagram for showing protocol processing layers in a hierarchical manner, which is realized by an image output device 2 of the image output system according to the second embodiment of the present invention.

FIG. 8 is a diagram for representing protocol processing layers which are realized in a hierarchical manner in the image output device 2 of the image output system according to the second embodiment of the present invention. As indicated in FIG. 8, in addition to the case shown in FIG. 4, in the image output device 2 employed in the image output system according to the second embodiment, since the CPU 41 executes a program 61, an HTTP layer 84b3 corresponding to a processing unit capable of realizing the HTTP client function is realized in a lower grade of the DPDP layer 85b.

Next, a description is made of operations of the respective apparatus employed in the above-described image output system.

In the image output system according to this second embodiment, the client terminal device 1 views a Web page opened by the Web server apparatus 6 by executing a Web browser program equal to an HTTP client in response to an operation by the user, and then, acquires a URL of an image data file 101 having data of an image within this opened Web page.

Thereafter, in the case that the user wants to output this image by the image output device 2, the user performs a predetermined operation with respect to the input apparatus 17 of the client terminal device 1. The client terminal device 1 designates the image data file 101 in the image output request based upon this URL in response to this operation by the user, and transmits an XML script containing a control command of an image output request to the image output device 2 in the form of an electronic mail.

When the image output device 2 receives the transmitted electronic mail, in the case that a designation of an image data file as to an image output subject contained in the image output request is described by a URL, the image output device 2 downloads the image data file designated by this URL by utilizing the HTTP client function so as to acquire this image data file. In this case, in the image output device 2, the CPU 41 functioning as the DPDP layer 85b acquires the URL from the control command, the CPU 41 functioning as the HTTP layer 84b3 accesses the Web server apparatus 6 in order to acquire the image data file 101 of this URL in accordance with the HTTP protocol.

Then, the image output device 2 executes an image output process operation by using the acquired image data file 101 in a similar manner to that of the above-described first embodiment.

It should also be understood that since other operations of the respective apparatus in the second embodiment are similar to those of the above-described embodiment 1, descriptions thereof are omitted.

As previously explained, in accordance with the above-described second embodiment, the POP3 layer 84b2 of the image output device 2 receives as the receiving unit the control information related to the image output as the text data by way of the electronic mail, whereas the SMTP layer 84b1 transmits as the transmitting unit the control information related to the image output to the client terminal device 1 of the transmission source of the electronic mail which is received by the POP3 layer 84b2, as the text data by way of the electronic mail. Then, both the DPDP layer 85b and the HTTP layer 84b3 acquire the image data file 101 from the Web server apparatus 6 as the image data file acquiring unit.

As a result, since the electronic mail containing the control information can be transferred from the specific image output device 2 to the client terminal device 1, even in such a case that the client terminal device 1 transmits the image output request to the specific image output device 2 by way of the electronic mail, the status of the image output process operation can be grasped on the client side.

Also, in accordance with the above-described second embodiment, the DPDP processing unit 85a of the client terminal device 1 transmits such a control information to the image output device 2, while the image data file 101 on the computer network is employed as the image data of the image output subject, and this control information contains the URL of the image data file 101 on this computer network as the storage place information.

As a result, the image formed based upon the image data file 101 which has not been stored in the client terminal device 1 can be outputted by the image output device 2. As a consequence, in such a case that the image data file 101 which has not been stored in the client terminal device 1 is outputted, this image data file 101 need not be once downloaded to the client terminal device 1.

Furthermore, in accordance with the above-described second embodiment, since the CPU 11 of the client terminal device 1 executes the predetermined browser program, this CPU 11 accesses the Web server apparatus 6 which stores the image data file 101 on the computer network as the storage place specifying unit so as to specify the URL of the image data file 101 on the computer network. Then, the POP3 layer 84b2 of the image output device 2 receives the control information containing the URL indicative of the storage place of the image data file 101 on the computer network. The DPDP layer 85b controls the HTTP layer 84b so as to download the image data file 101 from the storage place on the computer network, which is designated by this URL, and thus, acquires the downloaded image data file 101.

As a result, the user no longer inputs the storage place of the image data file 101 on the computer network to the client terminal device 1, and can simply output the image data file 101 on the computer network.

Third Embodiment

Figure 9:
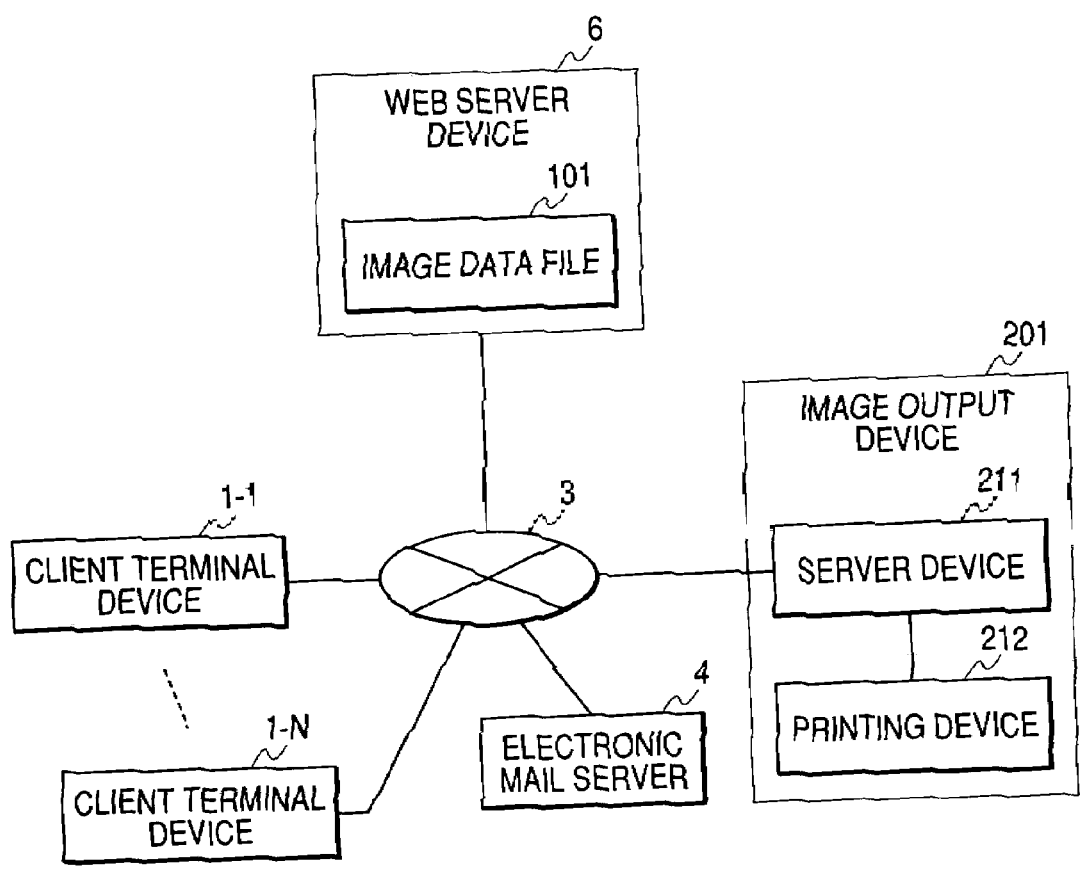
FIG. 9 is a block diagram for representing an arrangement of an image output system according to a third embodiment of the present invention.

FIG. 9 is a block diagram for showing an arrangement of an image output system according to a third embodiment of the present invention. In FIG. 9, client terminal device "1-i" (symbol "i" is equal to 1, - - - , N) correspond to such apparatus similar to the above-described client terminal device 1 in the embodiment modes 1 and 2. Also, an image output device 201 owns both a server apparatus 211 and a printing apparatus 212. The server apparatus 211 corresponds to an apparatus which executes a communication processing operation with respect to the client terminal device "1-i", and also, queues a plurality of image output requests so as to perform a job managing operation.

The server apparatus 211 further owns a specific IP address, and also, has an SMTP server function instead of the POP3 client function, and directly receives an electronic mail sent from the electronic mail server 4. In this case, the electronic mail server 5 is not required. It should be noted that similar to the first embodiment, while the electronic mail server 5 is provided, the server apparatus 211 may alternatively acquire an electronic mail from the electronic mail server 5 by the POP3 in a similar manner to the image output device 2.

It should also be noted that the server apparatus 211 owns the same structural units of the above-described image output device 2 except for the image output mechanism, and produces a print control command based upon each of the image output requests so as to supply the produced print control command to the printing apparatus 212. Also, the printing apparatus 212 receives this print control command, and executes a printing process operation in correspondence with this received print control command.

As a consequence, for example, while the server apparatus 211 may be alternatively realized as a personal computer into which the above-described program 61 and a device driver used for driving the printing apparatus 212 have been installed, the printing apparatus 212 may be alternatively realized as a personal computer-purpose printer which receives such a print control command as ESC/P supplied from the personal computer.

As a result, the image output device 201 accepts the image output requests issued from a plurality of client terminal device "1-1" through "1-N" so as to sequentially process these image output requests. It should also be understood that since operations of the respective apparatus in the third embodiment are similar to those of either the first embodiment or the second embodiment, explanations thereof are omitted.

Fourth Embodiment

An image output system, according to a fourth embodiment of the present invention, is featured by that when an image data file is transferred from a client terminal device 1 to an image output device 2 as an attached file of an electronic mail, image data portions of the image data file are sequentially attached to electronic mails as attached files, and the electronic mails are sequentially transferred. It should be understood that a basic arrangement of the image output system according to the fourth embodiment is similar to that of the first embodiment. However, it should also be noted that both operation of the client terminal device 1 and operation of the image output device 2 related to transfer operations of the image data file are different from those of the first embodiment, and are carried out in accordance with the below-mentioned manner.

Figure 10:
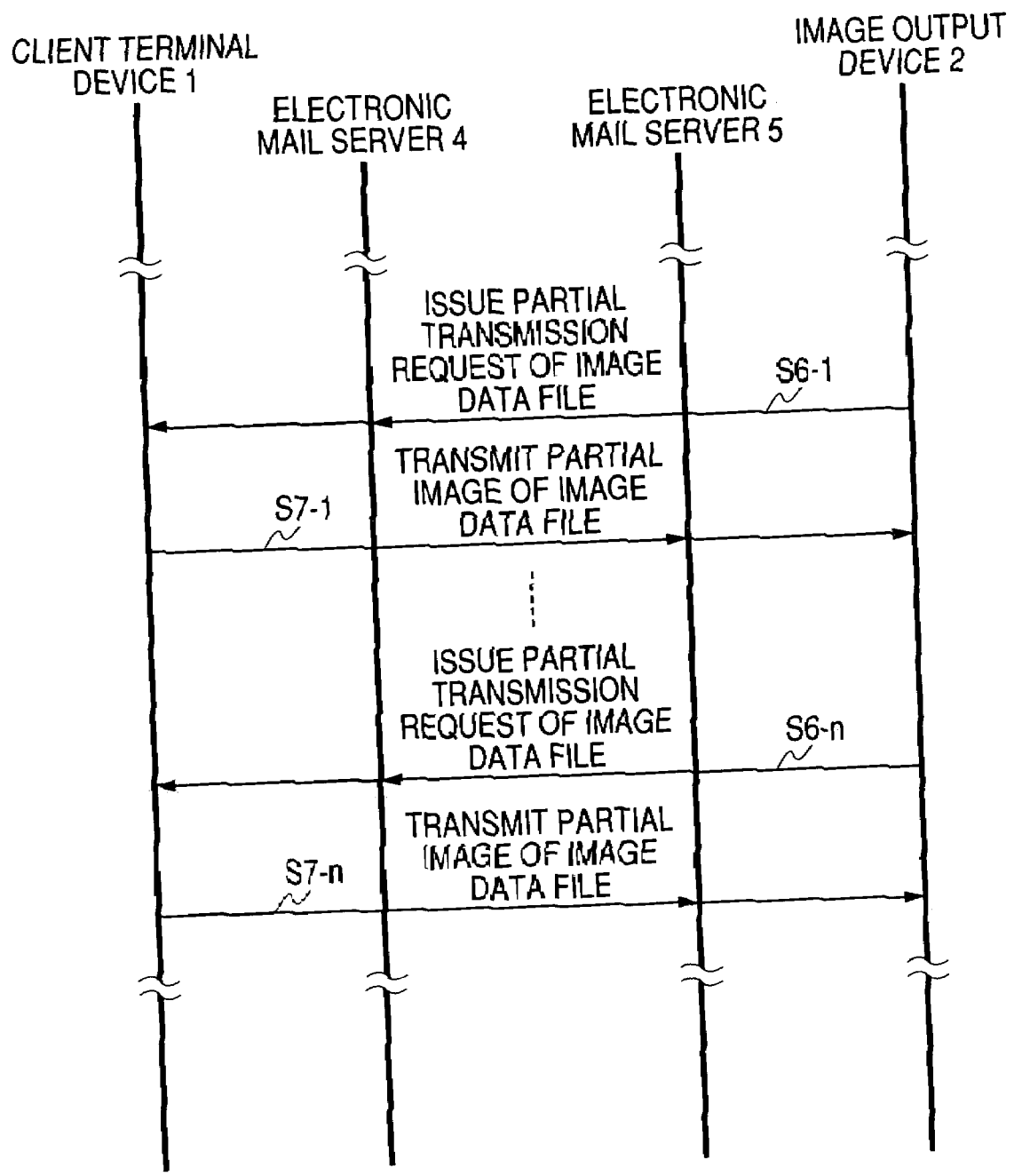
FIG. 10 is a diagram for explaining a transmission operation of an image data file when an image output processing operation is carried out in an image output system according to a fourth embodiment of the present invention.

Next, a description is made of a transferring operation as to an image data file from the client terminal device 1 to the image output device 2 in this fourth embodiment. FIG. 10 is a diagram for explaining the transferring operation of the image data file when an image output processing operation is performed in the image output system according to the fourth embodiment of the present invention. It should also be noted that FIG. 10 indicates only process operations which will be executed, instead of the process operations defined in the steps S6 and S7 in the first embodiment (see FIG. 5).

In the fourth embodiment, when the CPU 41 functioning as the DPDP layer 85b of the image output device 2 analyzes an image output request so as to specify both an image output condition and an image data file of an image output subject (step S5 of FIG. 5), the CPU 41 produces a control command corresponding to a partial transmission request for this image data file of the image output subject as an XML script, and transmits this produced XML script as the SMTP layer 84b1 by way of an electronic mail (step S6-1). In this case, the partial transmission request contains an offset (head position) and a data size, while the offset designates a transmission subject portion within the image data file. It should also be noted that the data size is selected to be smaller than, or equal to a size of a storage area for storing the image data file, which is secured in either the RAM 43 or the storage unit 44 of the image output device 2.

In the client terminal device 1, when this electronic mail is received, the CPU 11 functioning as the DPDP layer 85a produces an XML script of a response to the partial transmission request of the image data file 32, and reads out a portion of the image data file 32 from the storage unit 14. This image data file 32 is designated by the image data file partial transmission request contained in this electronic mail. Then, the CPU 11 functioning as the DPDP layer 85a transmits an electronic mail by the SMTP layer 84a1, while the XML script of this response is used as a main body of the electronic mail and a portion of this image data file 32 is employed as attached data (step S7-1).

Then, as previously explained, the CPU 11 functioning as the SMTP layer 84a1 produces a content of an electronic mail having a body of a multi-part, and then, transmits this produced electronic mail by an SMTP command. The multi-part body is constituted by a header for MIME to which both a destination and a transmission source have been set, an XML script of this response based upon MIME, and attached data for an image data portion of the image data file 32.

In the image output device 2, when the transmitted electronic mail is acquired from the electronic mail server 5, the CPU 41 functioning as the DPDP layer 85b stores a portion of the image data which has been received in combination with the XML script of the response into a predetermined area of either the RAM 43 or the storage unit 44.

Next, either an image output operation or a data processing operation for the image output operation is completed as to an image data portion of this image data file. Then, when this image data portion is not required, the CPU 41 functioning as the DPDP layer 85b of the image output device 2 designates a next image data portion of the image data file by way of an offset and a data size, and acquires this next image data portion in a similar manner to the process operations (step S6-1 and S7-1) in the above-described case. In this case, the offset is set to the next position of the image data portion which has been acquired in the previous time. Subsequently, both the image output device 2 and the client terminal device 1 repeatedly perform the above-described processing operations up to a final image data portion (steps S6-n and S7-n) of the image data file in a similar manner.

It should also be noted that since other operations as to both the client apparatus 1 and the image output device 2 are similar to those of the above-described first embodiment, explanations thereof are omitted.

As previously explained, in accordance with the above-explained fourth embodiment, when the image data file is transferred from the client terminal device 1 to the image output device 2, the image data file is formed as the attached file of the electronic mail every image data portion, and a plurality of electronic mails are transferred, so that the entire image data file may be transferred.

As a consequence, since the image output device 2 can acquire the image data file in the divided image data forms, the size of the storage area for storing the image data file in the image output device 2 can be made small.

Fifth Embodiment

An image output system, according to a fifth embodiment of the present invention, is featured by that when an image data file is transferred from a client terminal device 1 to an image output device 2 as an attached file of an electronic mail, the image data file is divided into a plurality of divided image data, and these plural divided image data are transferred as attached files in a batch mode. It should be understood that a basic arrangement of the image output system according to the fifth embodiment is similar to that of the first embodiment. However, it should also be noted that both operation of the client terminal device 1 and operation of the image output device 2 related to transfer operations of the image data file are different from those of the first embodiment, and are carried out in accordance with the below-mentioned manner.

Figure 11:
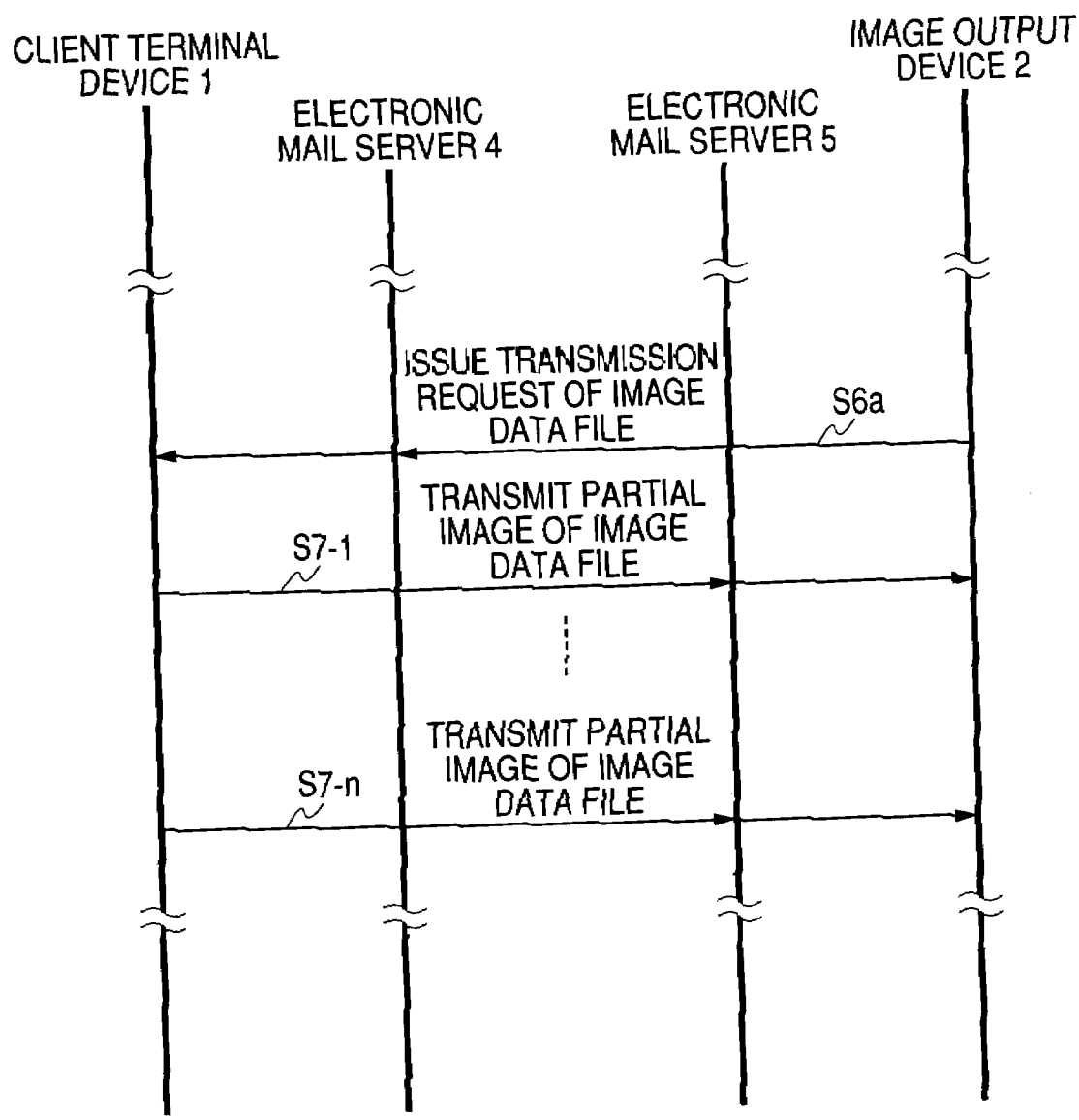
FIG. 11 is a diagram for explaining a transmission operation of an image data file when an image output processing operation is carried out in an image output system according to a fifth embodiment of the present invention.

Next, a description is made of a transferring operation as to an image data file from the client terminal device 1 to the image output device 2 in this fifth embodiment. FIG. 11 is a diagram for explaining the transferring operation of the image data file when an image output processing operation is performed in the image output system according to the fifth embodiment of the present invention. It should also be noted that FIG. 11 indicates only process operations which will be executed, instead of the process operations defined in the steps S6 and S7 in the first embodiment (see FIG. 5).

In the fifth embodiment, when the CPU 41 functioning as the DPDP layer 85b of the image output device 2 analyzes an image output request so as to specify both an image output condition and an image data file of an image output subject (step S5 of FIG. 5), the CPU 41 produces a control command corresponding to a transmission request for this image data file of the image output subject as an XML script, and transmits this produced XML script as the SMTP layer 84b1 by way of an electronic mail (step S6a).

In this case, the transmission request contains data sizes of the respective image data portions after the image data file has been divided. It should also be noted that the data size is selected to be smaller than, or equal to a size of a storage area for storing the image data file, which is secured in either the RAM 43 or the storage unit 44 of the image output device 2.

In the client terminal device 1, when this electronic mail is received, the CPU 11 functioning as the DPDP layer 85a produces an XML script of a response to the transmission request of the image data file. Also, the CPU 11 reads out the image data file 32 from the storage unit 14. This image data file 32 is designated by the image data file transmission request contained in this electronic mail. Then, the CPU 11 divides the read image data file 32 into image data portions whose sizes are smaller than, or equal to the designated data size.

Then, the CPU 11 functioning as the DPDP layer 85a transmits a plurality of electronic mails in a batch manner, the total number of which is equal to the total division number, while the XML script of this response is employed as a main body of one electronic mail and an image data portion of the image data file 32 after the dividing operation is employed as attached data thereof (steps S7-1 to S7-n). In this case, sequential information (for instance, character string made of numeral such as serial number) indicative of a sequence of a divided image data portion is inserted in either a main body or a title of each of the electronic mails.

Then, as previously explained, the CPU 11 functioning as the SMTP layer 84a1 produces a content of an electronic mail having a body of a multi-part, and then, transmits this produced electronic mail by an SMTP command. The multi-part body is constituted by a header for MIME to which both a destination and a transmission source have been set, an XML script of this response produced based upon MIME, and attached data for an image data portion.

In the image output device 2, the CPU 41 functioning as the DPDP layer 85b acquires a list of electronic mails stored in a mail box from the electronic mail server 5, and first of all, specifies such an electronic mail to which a head image data portion of the divided image data file has been attached, and also, acquires this specified electronic mail from the electronic mail server 5, and then, stores the image data portion of the image data file received in combination with the XML script of the response into a predetermined area of either the RAM 43, or the storage unit 44. It should be noted that the head image data portion of the image data file is discriminated based upon the sequential information inserted into either the main body or the title of the electronic mail.

Next, either an image output operation or a data processing operation for the image output operation is completed as to an image data portion of this image data file. Then, when this image data portion is not required, the CPU 41 functioning as the DPDP layer 85b of the image output device 2 acquires an electronic mail to which a next image data portion of the image data file has been attached from the electronic mail server 5. It should also be noted that the next image data portion is discriminated based upon the sequential information which has been inserted into either the main body or the title of the electronic mail. Subsequently, the image output device 2 repeatedly carries out the above-explained process operation up to a file image data portion (step S7-n) of the image data file in a similar manner.

It should also be noted that since other operations as to both the client apparatus 1 and the image output device 2 are similar to those of the above-described first embodiment, explanations thereof are omitted.

In the above-described fifth embodiment, in the transmission request of the image data file, the maximum value as to the data size of the divided image data portion is designated. Alternatively, the client terminal device 1 may divide the image data file based upon a data size having a predetermined fixed value without designating the data size.

As previously explained, in accordance with the above-explained fifth embodiment, when the image data file is transferred from the client terminal device 1 to the image output device 2, the image data file is divided into the image data portions which are formed as the attached files of the plural electronic mails, and a plurality of electronic mails are transferred, so that the entire image data file may be transferred.

As a consequence, since the image output device 2 can acquire the image data file in the divided image data forms, the size of the storage area for storing the image data file in the image output device 2 can be made small.

Also, in accordance with the above-explained fifth embodiment, since the upper limit value as to the data size of the divided image data portion is designated, the image data file can be transmitted and received as the data having the smaller size than the storage area for storing the image data file of the image output device 2, and thus, the image data file can be firmly supplied to the image output device 2.

Sixth Embodiment

An image output system, according to a sixth embodiment of the present invention, is featured by that only when a size of an image data file is larger than a size of a storage area for storing the image data file of the image output device 2, the image data file is divided into a plurality of divided image data, and while these plural divided image data are formed as attached files of plural electronic mails, these plural electronic mails are transferred. It should be understood that a basic arrangement of the image output system according to the sixth embodiment is similar to that of the first embodiment. However, it should also be noted that both operation of the client terminal device 1 and operation of the image output device 2 related to transfer operations of the image data file are different from those of the first embodiment, and are carried out in accordance with the below-mentioned manner.

Figure 12:
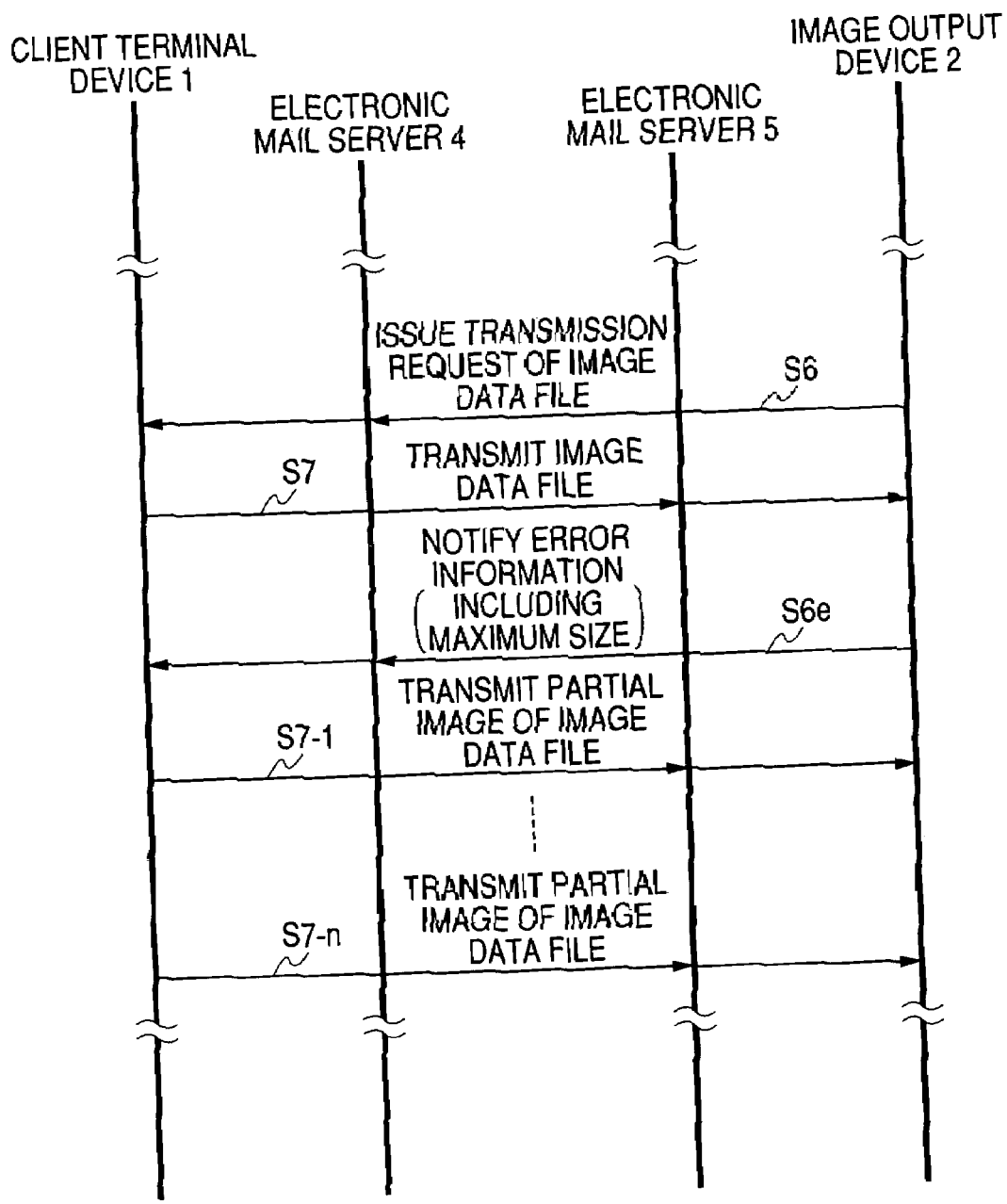
FIG. 12 is a diagram for explaining a transmission operation of an image data file when an image output processing operation is carried out in an image output system according to a sixth embodiment of the present invention.

Next, a description is made of a transferring operation as to an image data file from the client terminal device 1 to the image output device 2 in this sixth embodiment. FIG. 12 is a diagram for explaining the transferring operation of the image data file when an image output processing operation is performed in the image output system according to the sixth embodiment of the present invention. It should also be noted that FIG. 12 indicates only process operations which will be executed, instead of the process operations defined in the steps S6 and S7 in the first embodiment (see FIG. 5). In other words, in this sixth embodiment, process operations defined in a step S6e and steps S7-1 to S7-n are executed in addition to the steps S6 and S7, depending upon a certain case.

Similar to the first embodiment, in the sixth embodiment, the image output device 2 tries to acquire an image data file from the client terminal device 1. In this case, when the size of the image data file is larger than the size of the storage area for storing the image data file which is secured in either the RAM 43 or the storage unit 44, the image output device 2 transmits control information of an XML script containing error information to the client terminal device 1. At this time, the image output device 2 notifies the size of the storage area for storing the image data file in combination with this error information (step S6e).

When the client terminal device 1 receives this error information and the like, the client terminal device 1 divides the image data file, and resends the divided image data files by way of a plurality of electronic mails in a similar manner to that of the above-described fifth embodiment (steps S7-1 to S7-n). Then, the image output device 2 sequentially acquires the image data portions of the image data file from the electronic mail service 5, and executes image processing operations.

It should also be noted that in the above-described sixth embodiment, the maximum value of the data size as to the divided image data portion is notified to the client terminal device 1 in combination with the error information of the image data file. Alternatively, the client terminal device 1 may divide the image data file based upon in a data size having a predetermined fixed value without designating the data size.

It should also be noted that since other operations as to both the client apparatus 1 and the image output device 2 are similar to those of the above-described first embodiment, explanations thereof are omitted.

As previously explained, according to the above-described sixth embodiment, only in such a case that the size of the image data file is larger than the size of the storage area for storing the image data file of the image output device 2, the image data file is divided and the divided image data portions are formed as the attached files of the plural electronic mails.

As a consequence, even when the size of the image data file is larger than the size of the storage area for storing the image data file, the image data file can be transmitted and received as the data having the smaller size than the storage area for storing the image data file, and thus, the entire image data file can be firmly acquired.

Embodiment Mode 7

An image output system, according to a seventh embodiment of the present invention, is featured by that an image output device 2 which is used to output an image can be selected from either one or a plurality of image output devices 2 by a user interface.

Within the image output system according to the seventh embodiment, apparatuses other than a client terminal device 1 are similar to those of the first embodiment. In the client terminal device 1, a storage unit 14 stores thereinto an electronic mail address of one image output device 2, or electronic mail addresses of the plural image output devicees 2. Also, a display apparatus 19 displays thereon a list of the electronic mail addresses of the image output devicees 2. An input apparatus 17 accepts an input of a designation of such an image output device 2 which constitutes a transmission destination. Then, an electronic mail address of an image output device 2 corresponding to the designation entered to the input apparatus 17 is specified, and then, an image output process operation between this specified image output device 2 and the client terminal device 1 is carried out in the manner described in the above-explained embodiment modes 1 through 6.

Figure 13:
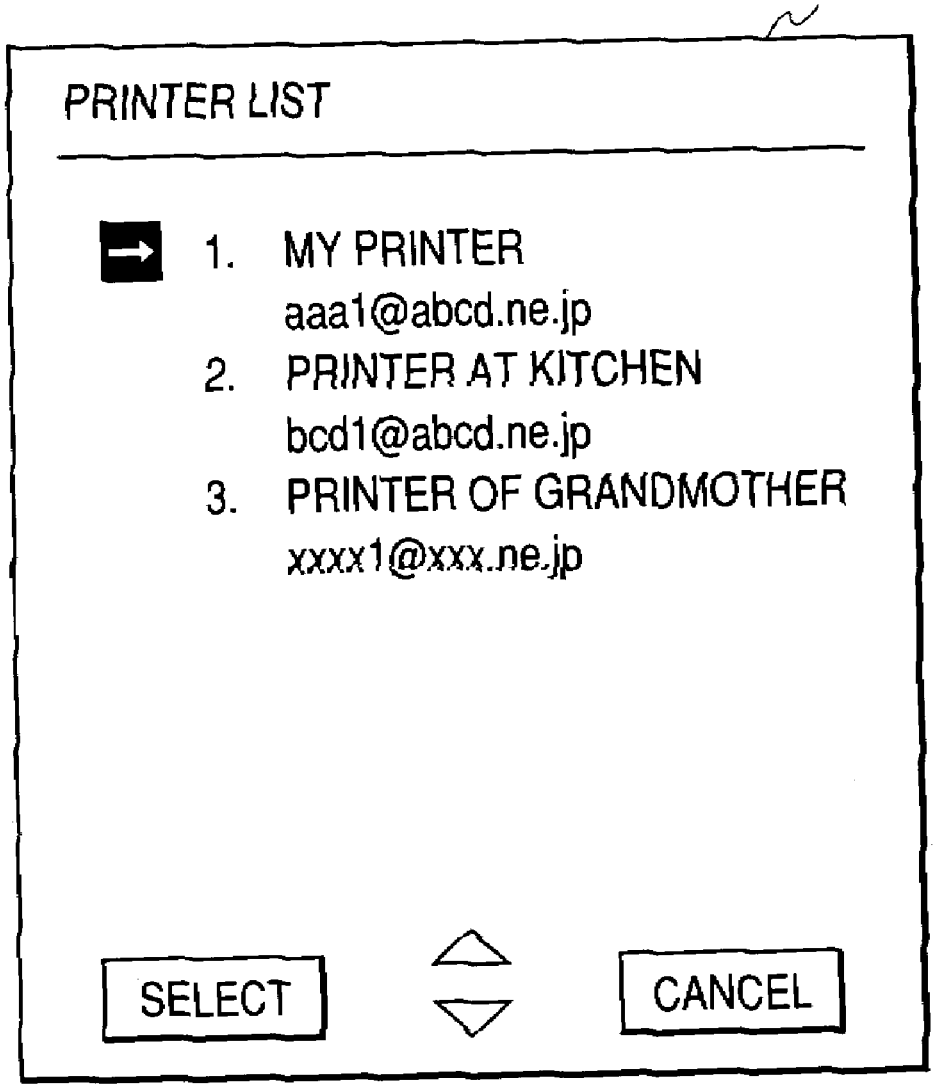
FIG. 13 is a diagram for indicating a display example of a list of an image output device executed in a client terminal device according to a seventh embodiment of the present invention.

FIG. 13 is a diagram for indicating a display example of a list as to the image output device 2 on the client terminal device 1 in the seventh embodiment. As shown in FIG. 13, nicknames ("my printer" etc.) of the image output devicees 2 are related to the electronic mail addresses thereof, and are displayed every image output device 2. Then, the user operates the input apparatus 17 so as to move an arrow cursor and to depress a selection button. In response to these operations made by the user for the input apparatus 17, the CPU 11 specifies such an image output device 2 selected by the user from the displayed list, and also, specifies an electronic mail address of this specified image output device 2.

The CPU 11 of the client terminal device 1 reads a table which contains the list information of the electronic mail addresses of the image output devicees 2 stored in the storage unit 14 at such predetermined timing as when an initial setting operation is performed, when an image output processing operation is commenced, and just before an image output request is sent, and also after an image data file has been determined. Based upon this read list information, the CPU 11 displays such an image as shown in FIG. 1 on the display apparatus 19, and then, the CPU 11 specifies an image output device 2 used to output an image based upon the input operation of the user with respect to the input apparatus 17.

It should also be noted that since other operations as to both the client apparatus 1 and the image output device 2 are similar to those of the above-described first embodiment, explanations thereof are omitted.

As previously described, in accordance with the above-explained embodiment mode 7, the client terminal device 1 displays the list of the electronic mail addresses of the image output devicees 2 on the display apparatus 19, accepts the input of the designation of the image output device 2 which constitutes the transmission destination, and specifies the electronic mail address of the image output device 2 corresponding to the designation entered to the input apparatus 17, and then, transmits the control information related to the image output to this specified image output device 2 so as to execute the image output processing operation.

As a consequence, in the client terminal device 1, the image output device which is used to output the image can be simply selected.

It should be understood that although the above-explained respective embodiment modes are preferred examples of the present invention, the present invention is not limited thereto. Therefore, the present invention may be modified, changed, and substituted without departing from the technical scope and spirit of the invention.

For example, in the above-described respective embodiment modes, the electronic mail server 4 owns both the function of the SMTP server and the function of the POP3 server. Alternatively, a server apparatus having the function of the SMTP server, and another server apparatus having the function of the POP3 server may be separately provided. This alternative idea may be similarly applied to the electronic mail server 5.

Also, in the above-described respective embodiment modes, both the electronic mail server 4 and the electronic mail server 5 may be alternatively constructed as a single electronic mail server. Furthermore, in this alternative case, the domain of the electronic mail address of the client terminal device 1 may be made equal to the domains of the electronic mail addresses of the image output devicees 2 and 201. Also, in this case, the image output devicees 2 and 201 may alternatively accept only the image output request issued from the client terminal device 1, the domain of which is equal to the own domains of the image output devicees 2 and 201.

Also, in the above-described respective embodiment modes, the client terminal devicees 1, 1-1 to 1-N may be alternatively connected via a closed network and/or a subscriber line network such as a telephone line network to the computer network 3. In this alternative case, the electronic mail server 4 may be provided in either this closed network or the subscriber line network.

Also, in above-described respective embodiment modes, senders between the client terminal devicees 1, 1-1 to 1-N, and the image output devicees 2, 201 may be alternatively authenticated. For instance, digital signatures established by public keys of communication counter parties such as S/MIME (Secure/MIME) and PGP (Pretty Good Privacy) may be used. Alternatively, based upon an electronic mail address of a sender and a domain of this electronic mail address, only control information constituted by an electronic mail defined by a predetermined electronic mail address and a domain thereof may be employed. Alternatively, password authentication such as a one time password may be used. In this alternative case, the one time password may be inserted in each of XML scripts indicative of control information.

Also, in the above-described respective embodiment modes, the client terminal devicees 1, 1-1 to 1-N, and the image output device 2 use the SMTP protocol in a transmission of an electronic mail, and the POP3 protocol in a reception of an electronic mail, but may alternatively employ other protocols. As to a reception system of an electronic mail, other POP systems than the POP3 system may be used, and the IMAP (Internet Message Access Protocol) system may be used.

Although a title portion of an electronic mail is made of a specific character string indicative of an image output service in the above-described respective embodiment modes, this title portion of the electronic mail may be constructed of text data containing control information.

Also, in the above-described respective embodiment modes, the client terminal devicees 1, 1-1 to 1-N, may be alternatively realized as a mobile telephone having an imaging element, a display device, and a data communication function. In this alternative case, the program 31 may be previously stored in the ROMs of the client terminal devicees 1 and 1-1 to 1-N, or a non-volatile storage unit such as a rewritable ROM. Otherwise, this program 31 may be alternatively downloaded from a predetermined server by operating the above-explained data communication function.

Also, in the above-described respective embodiment modes, in such a case that the image output device 2 acquires image data portions divided from an image data file by way of a plurality of electronic mails so as to output an image, when a certain image data portion is again required after another image data portion has been used, the image output device 2 does not delete this relevant image data portion from the electronic mail server 5 after an electronic mail containing this relevant image data portion has been acquired, but continuously holds the relevant image data portion. Then, when the relevant image data portion is again required, the image output device 2 may alternatively acquire the electronic mail containing the relevant image data portion from the electronic mail server 5. For example, in such a case that the image output device 2 corresponds to an ink jet printer, or the like, when an image of an image data file is decoded to a print control command for such an image which has been rotated by 90 degrees, data as to the same place within the image data file is required plural times during a decoding operation. As a result, in such a case, the image output device 2 causes the electronic mail to be left in the electronic mail server 5 in the above-explained manner. It should also be understood that when an image data portion contained in the left electronic mail is no longer required, or when an image output operation based upon this image data file is accomplished, the image output device 2 may alternatively cause the electronic mail server 5 to delete the remaining electronic mail.

Also, in the above-explained respective embodiment modes, in the case that an image (PIF image) is outputted which has been produced by superimposing a main image with a frame image based upon both a file of the frame image and a file of the main image, which is like a PIF (Print Image Framer), the client terminal devicees 1 and 1-1 to 1-N may alternatively transmit the above-described image to the image output device 2, while both the file of the frame image and the file of the main image are employed as an attached file. Then, the image output device 2 may alternatively produce a PIF image based upon these files so as to output the produced PIF image.

Further, in the above-mentioned respective embodiment modes, as an attached file of an electronic mail used to transmit an image output request, an image data file which is designated by this image output request may be alternatively attached to the electronic mail which is transmitted from the client terminal devicees 1 and 1-1 to 1-N to the image output device 2.

What is claimed is:

1. A method for outputting an image, comprising:
    transmitting, a first electronic mail comprising first control information from a client to an image output device, the first control information comprising an inquiry as to whether the image output device is providing an image output service;
    transmitting, in response to the first electronic mail, a second electronic mail from the image output device to the client, the second electronic mail comprising second control information, wherein the second control information comprises information indicating whether the image output device is providing the image output service, and if the image output device is providing the image output service, the second control information further comprises a list of capabilities of the image output device;
    transmitting, in response to the second electronic mail, a third electronic mail from the client to the image output device, the third electronic mail comprising third control information comprising a request to output an image, the request based on the capabilities of the image output device included in the second control information;
    outputting the image at the image output device in response to the third electronic mail;
    providing a storage at the client for storing the image as an image data file;
    transmitting, in response to the third electronic mail, a fourth electronic mail from the image output device to the client, the fourth electronic mail requesting the image data file from the client; and
    transmitting, in response to the fourth electronic mail, a fifth electronic mail from the client to the image output device, the fifth electronic mail comprising the image data file,
    wherein the image is outputted based on the received image data file at the image output device.

2. The method as set forth in claim 1, wherein the second control information further indicates a status of an output procedure of the image output device.

3. The method as set forth in claim 1, wherein the first control information is transmitted as text data by the first electronic mail.

4. The method as set forth in claim 1, wherein the first control information is contained in at least one of the a title portion and a main body portion of the first electronic mail; and wherein the image data file is contained in date which is attached to the fifth electronic mail.

5. The method as set forth in claim 1, wherein the third control information includes storage place information which indicates a storage place of the image data file on network.

6. The method as set forth in claim 5, further comprising:
    accessing the storage which stores the image data file on the network; and
    specifying, in the third control information, the storage place of the image data file on the network.

7. The method as set forth in claim 1, further comprising:
    monitoring as to whether the second electronic mail including the second control information is received by the client or not after the first control information is transmitted to the image output device.

8. The method as set forth in claim 1, wherein the first control information is transmitted to the image output device via the first electronic mail by the client in accordance with SMTP, and
    wherein the second control information is transmitted by the second electronic mail by the image output device in accordance with either POP or IMAP.

9. The method as set forth in claim 1, further comprising: dividing the image data file into a plurality of image data portions; attaching at least one of the image data portions to the fifth electronic mail; and transmitting the fifth electronic mail to which the at least one of the image data file portions is attached as an attached file to the image output device.

10. The method as set forth in claim 9, wherein the image data file is divided in response to a capacity of a storage area for storing the image data file in the image output device.

11. The method as set forth in claim 9, further comprising: transmitting size information regarding at least one of sizes of the divided plurality of the image data portions and a maximum size among the divided plurality of the image data portions.

12. The method as set forth in claim 9, farther comprising: acquiring, at the image output device, the at least one image data portion from the attached file of the fifth electronic mail when a size of the image data file is larger than a capacity of a storage area for storing the data file in the image output device.

13. The method as set forth in 1, further comprising:
providing a second storage which stores an electronic mail address of at least one image output device;
displaying a list of the electronic mail address of the at least one image output device;
receiving an input for designating the image output device for outputting the image, from the list;
specifying the electronic mail address of the designated image output device based on the input; and
transmitting the first control information to the specified electronic mail address of the designated image output device via the first electronic mail.

14. An image output system in which a client terminal device is connected via a network to an image output device, the image output system comprising:
the client terminal device including:
a first transmitting/receiving unit, which transmit and receives control information regarding an image output as text data by electronic mail;
the image output device including:
a second transmitting/receiving unit, which transmits and receives control information as text data by electronic mail between the first transmitting/receiving unit and the second transmitting/receiving unit; and
an image output unit, which outputs an image based on an image data file in accordance with the control information received by the second transmitting/receiving unit,
wherein the first transmitting/receiving unit transmits a first electronic mail comprising first control information to the image output device, the first control information comprising an inquiry as to whether the image output device is providing an image output service,
wherein the second transmitting/receiving unit transmits, in response to the first electronic mail, a second electronic mail from the image output device to the client, the second electronic mail comprising second control information, wherein the second control information comprises information indicating whether the image output device is providing the image output service, and if the image output device is providing the image output service, the second control information further comprises a list of capabilities of the image output device,
wherein the first transmitting/receiving unit transmits, in response to the second electronic mail, a third electronic mail from the client to the image output device, the third electronic mail comprising third control information comprising a request to output an image, the request based on the capabilities of the image output device included in the second control information,
wherein the image output unit, in response to the third electronic mail, outputs the image,
wherein the client terminal device further comprises a storage for storing the image as an image data file,
wherein the second transmitting/receiving unit is configured to transmit, in response to the third electronic mail, a fourth electronic mail from the image output device to the client, the fourth electronic mail requesting the image data file from the client,
wherein the first transmitting/receiving unit is configured to transmit, in response to the fourth electronic mail, a fifth electronic mail from the client to the image output device, the fifth electronic mail comprising the image data file,
wherein the image output unit is configured to output the image based on the received image data file at the image output device.

* * * * *